United States Patent
Yatsu

(10) Patent No.: US 9,479,080 B2
(45) Date of Patent: Oct. 25, 2016

(54) MULTILEVEL CONVERTER CIRCUIT FOR GENERATING A PLURALITY OF VOLTAGE LEVELS

(71) Applicant: FUJI ELECTRIC CO., LTD., Kawasaki-shi (JP)

(72) Inventor: Makoto Yatsu, Akiruno (JP)

(73) Assignee: FUJI ELECTRIC CO., LTD., Kawasaki-shi (JP)

(*) Notice: Subject to any disclaimer, the term of this patent is extended or adjusted under 35 U.S.C. 154(b) by 150 days.

(21) Appl. No.: 14/100,596

(22) Filed: Dec. 9, 2013

(65) Prior Publication Data

US 2014/0098587 A1    Apr. 10, 2014

Related U.S. Application Data

(63) Continuation of application No. PCT/JP2012/063508, filed on May 25, 2012.

(30) Foreign Application Priority Data

Jul. 5, 2011  (JP) .................................. 2011-149269

(51) Int. Cl.
*H02M 7/483*    (2007.01)
*H02M 7/537*    (2006.01)
(Continued)

(52) U.S. Cl.
CPC .............. *H02M 7/537* (2013.01); *H02M 7/483* (2013.01); *H02M 1/36* (2013.01); *H02M 7/487* (2013.01); *H02M 2007/4835* (2013.01)

(58) Field of Classification Search
CPC .................... H02M 7/483; H02M 2007/4835; H02M 7/537

USPC .................................................. 363/131, 132
See application file for complete search history.

(56) References Cited

U.S. PATENT DOCUMENTS

| | | | |
|---|---|---|---|
| 6,058,031 A * | 5/2000 | Lyons | H02M 7/487 363/132 |
| 6,151,227 A | 11/2000 | Mizutani et al. | |
| 6,278,626 B1 | 8/2001 | Teichmann | |

(Continued)

FOREIGN PATENT DOCUMENTS

| | | |
|---|---|---|
| CN | 101336508 A | 12/2008 |
| CN | 101860248 A | 10/2010 |

(Continued)

OTHER PUBLICATIONS

Office Action issued in CN201280028753.2, mailed Jun. 3, 2015. English translation provided.

(Continued)

*Primary Examiner* — Jessica Han
*Assistant Examiner* — David A. Singh
(74) *Attorney, Agent, or Firm* — Rossi, Kimms & McDowell LLP

(57) ABSTRACT

In some aspects, a direct current power source, formed of a series connection circuit of single power sources, which has three mutually different voltage levels including zero can be provided with first, second, third, and fourth arm pairs, each configured by connecting two arms formed of semiconductor switches in series, an alternating current switch configured by combining semiconductor switches. As such, a plurality of voltage levels can be to be selected from and output by an on and off control of these switch elements.

14 Claims, 24 Drawing Sheets

(51) Int. Cl.
*H02M 7/487* (2007.01)
*H02M 1/36* (2007.01)

(56) References Cited

U.S. PATENT DOCUMENTS

| | | | |
|---|---|---|---|
| 6,480,403 B1 | 11/2002 | Bijlenga | |
| 6,930,899 B2* | 8/2005 | Bakran | H02M 7/487 363/132 |
| 7,508,640 B2 | 3/2009 | Knapp et al. | |
| 2004/0246746 A1* | 12/2004 | Norrga | H02M 7/4826 363/16 |
| 2007/0025126 A1 | 2/2007 | Barbosa et al. | |
| 2008/0315859 A1 | 12/2008 | Ponnaluri et al. | |
| 2011/0193412 A1* | 8/2011 | Lacarnoy | H02M 7/483 307/75 |

FOREIGN PATENT DOCUMENTS

| | | |
|---|---|---|
| EP | 2251969 A1 | 11/2010 |
| JP | 11-164567 A | 6/1999 |
| JP | 2009-525717 A | 7/2009 |
| JP | 2010-246189 A | 10/2010 |
| JP | 2010-246267 A | 10/2010 |
| JP | 2011-072188 A | 4/2011 |
| WO | 2005124961 A1 | 12/2005 |

OTHER PUBLICATIONS

European Search Report issued in European counterpart application No. EP12808191.6, dated Feb. 2, 2015.

* cited by examiner

FIG. 3

|  | Q1 | Q2 | Q3 | Q4 | Q5 | Q6 | Q7 | Q8 | QR1 | QR2 | Output | C1 | C2 |
|---|---|---|---|---|---|---|---|---|---|---|---|---|---|
| P1 | ON | ON | ON | OFF | OFF | OFF | OFF | ON | OFF | ON | +3E | | |
| P2 | ON | ON | OFF | ON | OFF | OFF | OFF | ON | OFF | ON | | Charged | |
| P3 | ON | OFF | ON | OFF | ON | OFF | OFF | ON | OFF | ON | +2E | Discharged | Charged |
| P4 | OFF | ON | ON | OFF | OFF | OFF | OFF | ON | ON | ON | | | Discharged |
| P5 | ON | OFF | OFF | ON | ON | OFF | OFF | ON | OFF | ON | | | Charged |
| P6 | OFF | ON | OFF | ON | OFF | OFF | OFF | ON | ON | ON | +1E | Charged | Discharged |
| P7 | OFF | OFF | ON | OFF | ON | OFF | OFF | ON | ON | ON | | Discharged | |
| P8 | OFF | OFF | OFF | ON | ON | OFF | OFF | ON | ON | ON | 0 | | |
| P9 | OFF | ON | ON | OFF | OFF | OFF | ON | OFF | ON | ON | | | |
| P10 | OFF | ON | OFF | ON | OFF | OFF | ON | OFF | ON | ON | | Discharged | |
| P11 | OFF | OFF | ON | OFF | ON | OFF | ON | OFF | ON | ON | -1E | Charged | Discharged |
| P12 | OFF | ON | ON | OFF | OFF | ON | ON | OFF | ON | OFF | | | Charged |
| P13 | OFF | OFF | OFF | ON | ON | OFF | ON | OFF | ON | ON | | | Discharged |
| P14 | OFF | ON | OFF | ON | OFF | ON | ON | OFF | ON | OFF | -2E | Discharged | Charged |
| P15 | OFF | OFF | ON | OFF | ON | ON | ON | OFF | ON | OFF | | Charged | |
| P16 | OFF | OFF | OFF | ON | ON | ON | ON | OFF | ON | OFF | -3E | | |

FIG. 5

|     | Q1  | Q2  | Q3  | Q4  | Q5  | Q6  | Q7  | Q8  | QR1 | QR2 | Output | C1 | C2 |
|-----|-----|-----|-----|-----|-----|-----|-----|-----|-----|-----|--------|----|----|
| P1  | ON  | ON  | ON  | OFF | OFF | OFF | OFF | ON  | OFF | ON  | +4E    |    |    |
| P2  | ON  | ON  | OFF | ON  | OFF | OFF | OFF | ON  | OFF | ON  | +3E    | Charged |    |
| P3  | ON  | OFF | ON  | OFF | ON  | OFF | OFF | ON  | OFF | ON  |        | Discharged | Charged |
| P4  | OFF | ON  | ON  | OFF | OFF | OFF | OFF | ON  | ON  | ON  | +2E    |    | Discharged |
| P5  | ON  | OFF | OFF | ON  | ON  | OFF | OFF | ON  | OFF | ON  |        |    | Charged |
| P6  | OFF | ON  | OFF | ON  | OFF | OFF | OFF | ON  | ON  | ON  | +1E    | Charged | Discharged |
| P7  | OFF | OFF | ON  | OFF | ON  | OFF | OFF | ON  | ON  | ON  |        | Discharged |    |
| P8  | OFF | OFF | OFF | ON  | ON  | OFF | OFF | ON  | ON  | ON  | 0      |    |    |
| P9  | OFF | ON  | ON  | OFF | OFF | OFF | ON  | OFF | ON  | ON  |        |    |    |
| P10 | OFF | ON  | OFF | ON  | OFF | OFF | ON  | OFF | ON  | ON  | -1E    | Discharged |    |
| P11 | OFF | OFF | ON  | OFF | ON  | OFF | ON  | OFF | ON  | ON  |        | Charged | Discharged |
| P12 | OFF | ON  | ON  | OFF | OFF | ON  | ON  | OFF | ON  | OFF | -2E    |    | Charged |
| P13 | OFF | OFF | OFF | ON  | ON  | OFF | ON  | OFF | ON  | ON  |        |    | Discharged |
| P14 | OFF | ON  | OFF | ON  | OFF | ON  | ON  | OFF | ON  | OFF | -3E    | Discharged | Charged |
| P15 | OFF | OFF | ON  | OFF | ON  | ON  | ON  | OFF | ON  | OFF |        | Charged |    |
| P16 | OFF | OFF | OFF | ON  | ON  | ON  | ON  | OFF | ON  | OFF | -4E    |    |    |

FIG. 7

| | Q1 | Q2 | Q3 | Q4 | Q5 | Q6 | Q7 | Q8 | QR1 | QR2 | Output | C1 | C2 |
|---|---|---|---|---|---|---|---|---|---|---|---|---|---|
| P1 | ON | ON | ON | OFF | OFF | OFF | OFF | ON | OFF | ON | +4E | | |
| P2 | ON | ON | OFF | ON | OFF | OFF | OFF | ON | OFF | ON | +3E | Charged | |
| P3 | ON | OFF | ON | OFF | ON | OFF | OFF | ON | OFF | ON | +3E | Discharged | Charged |
| P4 | OFF | ON | ON | OFF | OFF | OFF | OFF | ON | ON | ON | +2E | | Discharged |
| P5 | ON | OFF | OFF | ON | ON | OFF | OFF | ON | OFF | ON | +2E | | Charged |
| P6 | OFF | ON | OFF | ON | OFF | OFF | OFF | ON | ON | ON | +1E | Charged | Discharged |
| P7 | OFF | OFF | ON | OFF | ON | OFF | OFF | ON | ON | ON | +1E | Discharged | |
| P8 | OFF | OFF | OFF | ON | ON | OFF | OFF | ON | ON | ON | 0 | | |
| P9 | OFF | ON | ON | OFF | OFF | OFF | ON | OFF | ON | ON | 0 | | |
| P10 | OFF | ON | OFF | ON | OFF | OFF | ON | OFF | ON | ON | -1E | Discharged | |
| P11 | OFF | OFF | ON | OFF | ON | OFF | ON | OFF | ON | ON | -1E | Charged | Discharged |
| P12 | OFF | ON | ON | OFF | OFF | ON | ON | OFF | ON | OFF | -2E | | Charged |
| P13 | OFF | OFF | OFF | ON | ON | OFF | ON | OFF | ON | ON | -2E | | Discharged |
| P14 | OFF | ON | OFF | ON | OFF | ON | ON | OFF | ON | OFF | -3E | Discharged | Charged |
| P15 | OFF | OFF | ON | OFF | ON | ON | ON | OFF | ON | OFF | -3E | Charged | |
| P16 | OFF | OFF | OFF | ON | ON | ON | ON | OFF | ON | OFF | -4E | | |

FIG. 9

|  | Q1 | Q2 | Q3 | Q4 | Q5 | Q6 | Q7 | Q8 | QR1 | QR2 | Output | C1 | C2 |
|---|---|---|---|---|---|---|---|---|---|---|---|---|---|
| P1 | ON | ON | ON | OFF | OFF | OFF | OFF | ON | OFF | ON | +4E |  |  |
| P2 | ON | ON | OFF | ON | OFF | OFF | OFF | ON | OFF | ON | +3E | Charged |  |
| P3 | ON | OFF | ON | OFF | ON | OFF | OFF | ON | OFF | ON |  | Discharged | Charged |
| P4 | OFF | ON | ON | OFF | OFF | OFF | OFF | ON | ON | ON | +2E |  | Discharged |
| P5 | ON | OFF | OFF | ON | ON | OFF | OFF | ON | OFF | ON |  |  | Charged |
| P6 | OFF | ON | OFF | ON | OFF | OFF | OFF | ON | ON | ON | +1E | Charged | Discharged |
| P7 | OFF | OFF | ON | OFF | ON | OFF | OFF | ON | ON | ON |  | Discharged |  |
| P8 | OFF | OFF | OFF | ON | ON | OFF | OFF | ON | ON | ON | 0 |  |  |
| P9 | OFF | ON | ON | OFF | OFF | OFF | ON | OFF | ON | ON |  |  |  |
| P10 | OFF | ON | OFF | ON | OFF | OFF | ON | OFF | ON | ON | -1E | Discharged |  |
| P11 | OFF | OFF | ON | OFF | ON | OFF | ON | OFF | ON | ON |  | Charged | Discharged |
| P12 | OFF | ON | ON | OFF | OFF | ON | ON | OFF | ON | OFF | -2E |  | Charged |
| P13 | OFF | OFF | OFF | ON | ON | OFF | ON | OFF | ON | ON |  |  | Discharged |
| P14 | OFF | ON | OFF | ON | OFF | ON | ON | OFF | ON | OFF | -3E | Discharged | Charged |
| P15 | OFF | OFF | ON | OFF | ON | ON | ON | OFF | ON | OFF |  | Charged |  |
| P16 | OFF | OFF | OFF | ON | ON | ON | ON | OFF | ON | OFF | -4E |  |  |

FIG. 11

| | Q1 | Q2 | Q3 | Q4 | Q5 | Q6 | Q7 | Q8 | QR1 | QR2 | QR3 | QR4 | Q9 | Q10 | QR5 | QR6 | Output | C1 | C2 |
|---|---|---|---|---|---|---|---|---|---|---|---|---|---|---|---|---|---|---|---|
| P1 | ON | ON | ON | OFF | OFF | OFF | OFF | ON | OFF | ON | OFF | ON | OFF | ON | OFF | ON | +2E | | |
| P2 | ON | ON | OFF | ON | OFF | OFF | OFF | ON | OFF | ON | OFF | ON | OFF | ON | OFF | ON | | Charged | |
| P3 | ON | OFF | ON | OFF | ON | OFF | OFF | ON | OFF | ON | OFF | ON | OFF | ON | OFF | ON | +2E | Discharged | Charged |
| P4 | OFF | ON | ON | OFF | OFF | OFF | OFF | ON | ON | ON | OFF | ON | OFF | ON | OFF | ON | | | Discharged |
| P5 | ON | OFF | OFF | ON | ON | OFF | OFF | ON | OFF | ON | OFF | ON | OFF | ON | OFF | ON | | | Charged |
| P6 | OFF | ON | OFF | ON | OFF | OFF | OFF | ON | ON | ON | OFF | ON | OFF | ON | OFF | ON | +1E | Charged | Discharged |
| P7 | OFF | OFF | ON | OFF | ON | OFF | OFF | ON | ON | ON | ON | OFF | ON | OFF | ON | | Discharged | | |
| P8 | OFF | OFF | OFF | ON | ON | OFF | OFF | ON | ON | ON | ON | OFF | ON | ON | ON | | 0 | | |
| P9 | OFF | ON | ON | OFF | OFF | OFF | ON | OFF | ON | ON | ON | ON | OFF | ON | ON | | | | |
| P10 | OFF | ON | OFF | ON | OFF | OFF | ON | OFF | ON | ON | ON | ON | OFF | ON | OFF | | Discharged | | |
| P11 | OFF | OFF | ON | OFF | ON | OFF | ON | OFF | ON | ON | OFF | ON | OFF | ON | OFF | -1E | Charged | Discharged |
| P12 | OFF | ON | ON | OFF | OFF | ON | ON | OFF | ON | OFF | ON | OFF | ON | OFF | | | Charged |
| P13 | OFF | OFF | OFF | ON | ON | OFF | ON | OFF | ON | ON | OFF | ON | OFF | ON | OFF | | | Discharged |
| P14 | OFF | ON | OFF | ON | OFF | ON | ON | OFF | ON | OFF | ON | OFF | ON | OFF | -2E | Discharged | Charged |
| P15 | OFF | OFF | ON | OFF | ON | ON | ON | OFF | ON | OFF | ON | OFF | ON | OFF | | | Charged |
| P16 | OFF | OFF | OFF | ON | ON | ON | ON | OFF | ON | OFF | ON | OFF | ON | OFF | -3E | | |

FIG. 13

| | Q1 | Q2 | Q3 | Q4 | Q5 | Q6 | QP1 | QR2 | QP3 | QR4 | QP5 | QR6 | Output | C3 | C4 |
|---|---|---|---|---|---|---|---|---|---|---|---|---|---|---|---|
| P1' | ON | ON | OFF | OFF | OFF | ON | OFF | ON | OFF | ON | OFF | ON | +3E | | |
| P2' | ON | OFF | OFF | OFF | OFF | ON | OFF | ON | OFF | ON | ON | ON | +2E | Charged | |
| P3' | OFF | ON | OFF | OFF | OFF | ON | ON | ON | OFF | ON | OFF | ON | | Discharged | Charged |
| P4' | ON | OFF | ON | OFF | OFF | ON | OFF | ON | OFF | ON | ON | OFF | | Charged | Charged |
| P5' | OFF | ON | OFF | OFF | OFF | OFF | ON | ON | ON | ON | OFF | ON | +1E | Discharged | |
| P6' | OFF | OFF | OFF | OFF | OFF | ON | ON | ON | OFF | ON | ON | ON | | | Discharged |
| P7' | OFF | OFF | OFF | OFF | OFF | OFF | ON | ON | ON | ON | ON | ON | 0 | | |
| P8' | OFF | OFF | OFF | OFF | ON | OFF | ON | ON | ON | OFF | ON | ON | | Discharged | |
| P9' | OFF | OFF | ON | OFF | OFF | OFF | ON | ON | ON | ON | ON | OFF | -1E | | Discharged |
| P10' | OFF | ON | OFF | ON | ON | OFF | ON | OFF | ON | OFF | OFF | ON | | Charged | Charged |
| P11' | OFF | OFF | ON | OFF | ON | OFF | ON | ON | ON | OFF | ON | OFF | -2E | Discharged | Discharged |
| P12' | OFF | OFF | OFF | ON | ON | OFF | ON | OFF | ON | OFF | ON | ON | | | Charged |
| P13' | OFF | OFF | ON | ON | ON | OFF | ON | OFF | ON | OFF | ON | OFF | -3E | | |

FIG. 20

| | Q1-a | Q1-b | Q2 | Q3 | Q4 | Q5 | Q6-a | Q6-b | Q7 | Q8 | QR1 | QR2 | Output | C1 | C2 |
|---|---|---|---|---|---|---|---|---|---|---|---|---|---|---|---|
| P1 | ON | ON | ON | OFF | OFF | OFF | OFF | OFF | ON | OFF | ON | | +3E | | |
| P2 | ON | ON | OFF | ON | OFF | OFF | OFF | OFF | ON | OFF | ON | | +2E | | Charged |
| P3 | ON | | OFF | ON | OFF | ON | OFF | OFF | OFF | ON | OFF | ON | | Discharged | Charged |
| P4 | OFF | ON | ON | ON | OFF | OFF | OFF | OFF | OFF | ON | ON | ON | | | Discharged |
| P5 | ON | | OFF | OFF | ON | ON | OFF | OFF | OFF | ON | OFF | ON | | | Charged |
| P6 | OFF | ON | ON | OFF | ON | OFF | OFF | OFF | ON | ON | ON | | +1E | Charged | Discharged |
| P7 | OFF | ON | OFF | ON | OFF | ON | OFF | OFF | OFF | ON | ON | ON | | Discharged | |
| P8 | OFF | ON | OFF | OFF | ON | ON | OFF | OFF | OFF | ON | ON | ON | 0 | | |
| P9 | OFF | | ON | ON | OFF | OFF | OFF | ON | ON | OFF | ON | ON | | | |
| P10 | OFF | | ON | OFF | ON | OFF | OFF | ON | ON | OFF | ON | ON | | Discharged | |
| P11 | OFF | | OFF | ON | OFF | ON | OFF | ON | ON | OFF | ON | ON | -1E | Charged | Discharged |
| P12 | OFF | | ON | ON | OFF | OFF | ON | | ON | OFF | ON | OFF | | | Charged |
| P13 | OFF | | OFF | OFF | ON | ON | OFF | ON | ON | OFF | ON | ON | | | Discharged |
| P14 | OFF | | ON | OFF | ON | OFF | ON | | ON | OFF | ON | OFF | -2E | Discharged | Charged |
| P15 | OFF | | OFF | ON | OFF | ON | ON | | ON | OFF | ON | OFF | | Charged | |
| P16 | OFF | | OFF | OFF | ON | ON | ON | | ON | OFF | ON | OFF | -3E | | |

FIG. 22

|   |   | Q1-a | Q1-b | Q2 | Q3 | Q4-a | Q4-b | Q5 | Q6 | QR1 | QR2 | QR3 | QR4 | QR5 | QR6 | Output | C3 | C4 |
|---|---|------|------|----|----|------|------|----|----|-----|-----|-----|-----|-----|-----|--------|-----|-----|
| I |   | ON | ON | OFF | OFF | OFF | ON | OFF | ON | OFF | ON | OFF | ON | OFF | ON | +3E | | |
| II | a | ON | OFF | OFF | OFF | OFF | ON | OFF | ON | OFF | ON | ON | ON | +2E | Charged | |
| II | b | OFF | ON | OFF | OFF | OFF | ON | ON | ON | OFF | ON | OFF | ON | | Discharged | Discharged |
| III | a | ON | OFF | ON | OFF | OFF | ON | OFF | ON | OFF | ON | ON | OFF | | Charged | Charged |
| III | b | OFF | ON | ON | OFF | OFF | ON | OFF | OFF | ON | ON | ON | OFF | ON | +1E | Discharged | |
| III | c | OFF | ON | OFF | OFF | OFF | ON | OFF | ON | ON | OFF | ON | ON | ON | | | Discharged |
| IV |   | OFF | ON | OFF | OFF | OFF | ON | OFF | OFF | ON | ON | ON | ON | ON | ON | 0 | | |
| V | a | OFF | ON | OFF | OFF | OFF | ON | ON | OFF | ON | ON | OFF | ON | ON | | Discharged | |
| V | b | OFF | ON | OFF | ON | OFF | ON | OFF | OFF | ON | ON | ON | ON | ON | OFF | −1E | | Discharged |
| V | c | OFF | ON | OFF | ON | OFF | ON | OFF | ON | OFF | ON | OFF | OFF | ON | | Charged | Charged |
| VI | a | OFF | OFF | ON | OFF | ON | OFF | ON | ON | ON | OFF | ON | OFF | −2E | Discharged | Discharged |
| VI | b | OFF | OFF | OFF | ON | ON | OFF | OFF | ON | OFF | ON | ON | | | Charged |
| VII |   | OFF | OFF | ON | ON | ON | OFF | ON | OFF | ON | OFF | ON | OFF | −3E | | |

MULTILEVEL CONVERTER CIRCUIT FOR GENERATING A PLURALITY OF VOLTAGE LEVELS

CROSS-REFERENCE TO RELATED APPLICATIONS

This application is a continuation of International Application No. PCT/JP2012/63508, filed on May 25, 2012, which is based on and claims priority to Japanese Patent Application No. JP 2011-149269, filed on Jul. 5, 2011. The disclosure of the Japanese priority application and the PCT application in their entirety, including the drawings, claims, and the specification thereof, are incorporated herein by reference.

BACKGROUND

1. Field of the Invention

Embodiments of the invention relate to multilevel converter circuits.

2. Related Art

FIG. 23 shows one phase's worth of seven-level converter circuit disclosed in, for example, Japanese Patent Application No. JP-A-11-164567 (also referred to herein as "PTL 1").

A series circuit of semiconductor switches Q1 to Q12 is connected between the positive terminal and negative terminal of a direct current combined power source BA2 wherein direct current single power sources b11 to b23 are connected in series, and the connecting point of the semiconductor switches Q6 and Q7, of the semiconductor switches Q1 to Q12, forms an alternating current output point U. Also, the outer side terminals of a diode pair DA1 formed of diodes D1 and D2 are connected between the connecting point of the semiconductor switches Q1 and Q2 and the connecting point of Q7 and Q8, and the midpoint terminal of the diode pair DA1 is connected to the connecting point of the direct current single power sources b11 and b12.

In the same way, the outer side terminals of a diode pair DA2 formed of diodes D3 and D4 are connected between the connecting point of the semiconductor switches Q2 and Q3 and the connecting point of Q8 and Q9, and the midpoint terminal of the diode pair DA2 is connected to the connecting point of the direct current single power sources b12 and b13, while the outer side terminals of a diode pair DA3 formed of diodes D5 and D6 are connected between the connecting point of the semiconductor switches Q3 and Q4 and the connecting point of Q9 and Q10, and the midpoint terminal of the diode pair DA3 is connected to the connecting point of the direct current single power sources b13 and b21. In the same way, the outer side terminals of a diode pair DA4 formed of diodes D7 and D8 are connected between the connecting point of the semiconductor switches Q4 and Q5 and the connecting point of Q10 and Q11, and the midpoint terminal of the diode pair DA4 is connected to the connecting point of the direct current single power sources b21 and b22, while the outer side terminals of a diode pair DA5 formed of diodes D9 and D10 are connected between the connecting point of the semiconductor switches Q5 and Q6 and the connecting point of Q11 and Q12, and the midpoint terminal of the diode pair DA5 is connected to the connecting point of the direct current single power sources b22 and b23.

In this kind of configuration, when the semiconductor switches Q1 to Q6 are turned on, and Q7 to Q12 are turned off, a voltage of +3E is output to the alternating current output terminal U, when the semiconductor switches Q2 to Q7 are turned on, and Q8 to Q12 and Q1 are turned off, a voltage of +2E is output to the alternating current output terminal U, when the semiconductor switches Q3 to Q8 are turned on, and Q9 to Q12, Q1, and Q2 are turned off, a voltage of +1E is output to the alternating current output terminal U, when the semiconductor switches Q4 to Q9 are turned on, and Q1 to Q3 and Q10 to Q12 are turned off, zero voltage is output to the alternating current output terminal U, when the semiconductor switches Q5 to Q10 are turned on, and Q11, Q12, and Q1 to Q4 are turned off, a voltage of −1E is output to the alternating current output terminal U, when the semiconductor switches Q6 to Q11 are turned on, and Q12 and Q1 to Q5 are turned off, a voltage of −2E is output to the alternating current output terminal U, and when the semiconductor switches Q7 to Q12 are turned on, and Q1 to Q6 are turned off, a voltage of −3E is output to the alternating current output terminal U.

By adjusting on and off of each semiconductor switch Q1 to Q12 as above, it is possible to output mutually different seven levels of voltages to the alternating current output terminal U.

FIG. 24 shows one phase's worth of nine-level converter circuit.

The converter circuit of FIG. 24 has nine levels extended from the seven levels of FIG. 23, and as the circuit configuration and operation are basically the same as those shown in FIG. 23, a description will be omitted. That is, by setting the voltage levels of three terminals of the direct current power source to 4E, 0, and −4E, and adjusting on and off of each semiconductor switch Q1 to Q16, it is possible to output mutually different nine levels of voltages to an alternating current output terminal U.

With the circuits of FIGS. 23 and 24, the number of semiconductor switches through which output current passes is a maximum of six in series or a maximum of eight in series between the direct current combined power source BA2 of each circuit and the alternating current output point U. Because of this, steady on loss in the semiconductor switches increases, thus causing a decrease in the efficiency of the whole of the device, and leading to a difficulty in miniaturization and price reduction.

Also, in such a general multilevel converter circuit as in FIGS. 23 and 24, as powers divided between direct current single power sources b11 to b14 and b21 to b24 are not the same in principle even when voltage and current output from the alternating current output point U have an alternating current waveform with symmetric positive and negative amplitudes, direct current single power sources independent of one another are necessary. Because of this, as six or eight single power sources which can supply powers independently are necessary for the direct current combined power source BA2 which is an input, this brings about a big restriction on manufacturing the device. This direct current power source imbalance problem is introduced in, for example, "A multi-level voltage-source converter system with balanced DC voltage" on pp 1144 to 1150 in the conference record of IEEE-PESC '95.

Therefore, a problem of the invention is to eliminate an operational restriction by reducing the number of semiconductor switches through which output current passes, thus achieving loss reduction, and by enabling an operation using two single power sources as a direct current input power source.

SUMMARY OF INVENTION

To address the shortcomings of the related art, in some embodiments of the invention, a multilevel converter circuit which generates a plurality of voltage levels from a direct current power source divided into two, including three terminals, and having three mutually different voltage levels including zero, and selects from and outputs the plurality of voltage levels, can include first, second, third, and fourth arm pairs, each configured by connecting two arms formed of semiconductor switches in series; and a first alternating current switch configured by combining semiconductor switches, the multilevel converter circuit being characterized in that the respective outer side terminals of the first arm pair, second arm pair, and third arm pair are connected in series, in order from a first direct current terminal, between the first direct current terminal wherein the potential of the direct current power source is highest and a third direct current terminal wherein the potential is lowest, the outer side terminals of the fourth arm pair are connected between the midpoint terminal of the first arm pair and the midpoint terminal of the third arm pair, both ends of the first alternating current switch are connected between the midpoint terminal of the fourth arm pair and a second direct current terminal wherein the potential of the direct current power source is intermediate, both ends of each of a first capacitor and second capacitor are connected in parallel to both ends of each of the second arm pair and fourth arm pair respectively, and the midpoint terminal of the second arm pair is formed as an alternating current terminal.

In some embodiments, it is possible that both ends of a second alternating current switch are connected between the midpoint terminal of the fourth arm pair and the midpoint terminal of the second arm pair, or it is possible that a fifth arm pair can be connected between the outer side terminals of the second arm pair, and both ends of the second alternating current switch are connected between the midpoint terminal of the fifth arm pair and the midpoint terminal of the fourth arm pair. In some embodiments, it is possible that both ends of a third alternating current switch are connected between the midpoint terminal of the fifth arm pair and the midpoint terminal of the second arm pair.

In some embodiments, it is possible that a multilevel converter circuit which generates a plurality of voltage levels from a direct current power source divided into two, including three terminals, and having three mutually different voltage levels including zero, and selects from and outputs the plurality of voltage levels, includes first, second, and third arm pairs, each configured by connecting two arms formed of semiconductor switches in series; and first, second, and third alternating current switches, each configured by combining semiconductor switches, the multilevel converter circuit being characterized in that the respective outer side terminals of the first arm pair and second arm pair are connected in series, in order from a first direct current terminal, between the first direct current terminal wherein the potential of the direct current power source is highest and a third direct current terminal wherein the potential is lowest, the outer side terminals of the third arm pair are connected between the midpoint terminal of the first arm pair and the midpoint terminal of the second arm pair, both ends of the first alternating current switch are connected between the midpoint terminal of the third arm pair and a second direct current terminal wherein the potential of the direct current power source is intermediate, the outer side terminals of a connection circuit wherein two capacitors are connected in series are connected in parallel to the outer side terminals of the third arm pair, both ends of the second alternating current switch is connected between the midpoint terminal of the capacitor series connection circuit and the midpoint terminal of the third arm pair, both ends of the third alternating current switch are connected between the midpoint terminal of the capacitor series connection circuit and the connecting point of the first arm pair and second arm pair, and the connecting point of the first arm pair, second arm pair, and third alternating current switch is formed as an alternating current terminal.

In some embodiments, it is possible that a high potential side arm configuring the first arm pair, a low potential side arm configuring the third arm pair, and two arms configuring the fourth arm pair are all configured of diodes, and in some embodiments, it is possible that the high potential side arm configuring the first arm pair, the low potential side arm configuring the third arm pair, the two arms configuring the fourth arm pair, and two arms configuring either the second arm pair or fifth arm pair are all configured of diodes. Also, in some embodiments, it is possible that the high potential side arm configuring the first arm pair, a low potential side arm configuring the second arm pair, and two arms configuring the third arm pair are all configured of diodes.

In some embodiments, it is possible that each of the alternating current switches is configured by connecting semiconductor switches having reverse breakdown voltage characteristics in anti-parallel, it is possible that each of the high potential side arm configuring the first arm pair and the low potential side arm configuring the third arm pair is configured of a series connection circuit of a plurality of semiconductor switches having the same function, and semiconductor switches configuring each arm are controlled by their respective individual control signals, and in some embodiments, it is possible that each of the high potential side arm configuring the first arm pair and the low potential side arm configuring the second arm pair is configured of a series connection circuit of a plurality of semiconductor switches having the same function, and semiconductor switches configuring each arm are controlled by their respective individual control signals.

In some embodiments, it is possible that the voltage levels of the three terminals of the direct current power source are set to +3E, 0, and −3E, and the levels of the voltages of the first capacitor and second capacitor are maintained at 1E and 2E respectively, and that a total of seven levels of voltages, +3E, +2E, 1E, 0, −1E, −2E, and −3E, are generated using the respective voltages of the direct current power source, first capacitor, and second capacitor, thus enabling an optional selection from and output of the voltage levels.

In some embodiments, it is possible that the voltage levels of the three terminals of the direct current power source are set to +4E, 0, and −4E, and the levels of the voltages of the first capacitor and second capacitor are maintained at 1E and 2E respectively, and that a total of nine levels of voltages, +4E, +3E, +2E, 1E, 0, −1E, −2E, −3E, and −4E, are generated using the respective voltages of the direct current power source, first capacitor, and second capacitor, thus enabling an optional selection from and output of the voltage levels, and some embodiments, it is possible that the voltage levels of the three terminals of the direct current power source are set to +3E, 0, and −3E, and the levels of the voltages of the first capacitor and second capacitor are maintained at 1E and 2E respectively, and that a total of seven levels of voltages, +3E, +2E, 1E, 0, −1E, −2E, and −3E, are generated using the respective voltages of the direct current power source, third capacitor, and fourth capacitor, thus enabling an optional selection from and output of the voltage levels.

According to some embodiments of the invention, the number of semiconductor switches through which output current passes is a maximum of four between the direct current power source side, which is an input, and the alternating current output, and it is thus possible to realize loss reduction. As a result of this, higher efficiency, price reduction, and miniaturization of a device are possible. Furthermore, as it is possible to form the direct current input power source as a combination of two single power sources, an operational restriction decreases as compared with heretofore known, and it is easy to actually fabricate the device.

BRIEF DESCRIPTION OF DRAWINGS

FIG. 3 is an illustration showing switching operation patterns when the embodiment of FIG. 1 is caused to operate as the seven-level converter circuit;

FIG. 5 is an illustration showing switching operation patterns when an embodiment of FIG. 1 is caused to operate as the nine-level converter circuit;

FIG. 7 is an illustration showing a switching operation pattern example of the circuit of FIG. 6;

FIG. 9 is an illustration showing a switching operation pattern example of an embodiment of FIG. 8;

FIG. 11 is an illustration showing a switching operation pattern example of an embodiment of FIG. 10;

FIG. 13 is an illustration showing a switching operation pattern example of an embodiment of FIG. 12;

FIG. 20 is an illustration showing a switching operation pattern example of an embodiment of FIG. 19;

FIG. 22 is an illustration showing a switching operation pattern example of an embodiment of FIG. 21;

DETAILED DESCRIPTION

Figure 1:
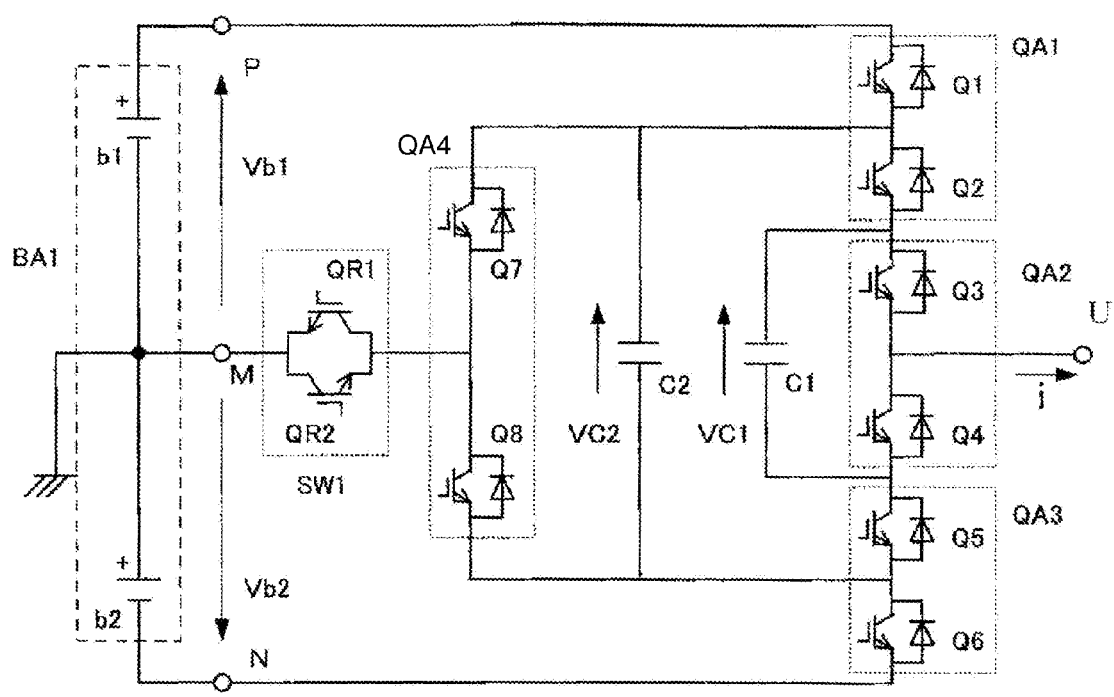
FIG. 1 is a circuit diagram showing an embodiment of the invention.
Figure 2:
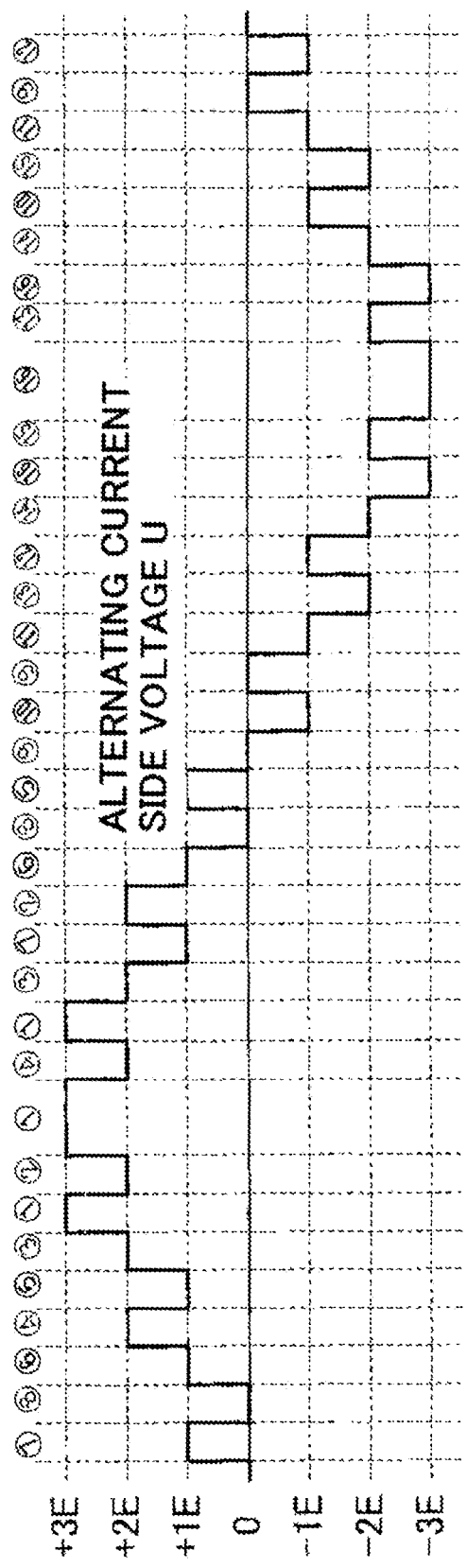
FIG. 2 is a waveform diagram showing an output voltage example when the embodiment of FIG. 1 is caused to operate as a seven-level converter circuit.

FIG. 1 is a circuit diagram showing an embodiment of the invention, FIG. 2 is an example diagram of a seven-level output waveform in FIG. 1, and FIG. 3 is an illustration of switching patterns in FIG. 1.

A direct current combined power source (also referred to simply as a direct current power source) BA1 is shown here as one, with direct current single power sources b1 and b2 connected in series, having three terminals, a positive terminal P, a negative terminal N, and a zero terminal (a ground terminal) M. An arm pair QA1 formed of semiconductor switches Q1 and Q2, an arm pair QA2 formed of semiconductor switches Q3 and Q4, and furthermore, an arm pair QA3 formed of semiconductor switches Q5 and Q6 are connected in series to the direct current power source BA1. Also, the outer side terminals of an arm pair QA4 formed of semiconductor switches Q7 and Q8 are connected between the midpoint terminal of the arm pair QA1 and the midpoint terminal of the arm pair QA3, and an alternating current switch SW1 formed of an inverse parallel connection circuit of semiconductor switches QR1 and QR2 having reverse breakdown voltage characteristics is connected between the midpoint terminal of QA4 and the zero terminal (ground terminal) M of the direct current power source BA1. Furthermore, a capacitor C2 is connected in parallel to the arm pair QA4, while a capacitor C1 is connected in parallel to the arm pair QA2, and the midpoint of the arm pair QA2 forms an alternating current output point U.

A description will be given hereafter of a case of causing the kind of configuration of FIG. 1 to operate in switching patterns P1 to P16 shown in FIG. 3.

Firstly, when the semiconductor switches Q1, Q2, and Q3 are turned on, and Q4, and QR1 of SW1, are turned off, as in the switching pattern P1, voltage Vb1 of the positive terminal of the direct current power source BA1 is directly output to the alternating current output point U. Output current, flowing along a path b1→Q1→Q2→Q3→U, passes through the three semiconductor switches Q1, Q2, and Q3. Herein, by keeping Q5, Q6, and Q7 turned off, Q4 is clamped by voltage VC1 of C1 in a path C1→Q3, and hereafter, in the same way, Q5 is clamped by voltage (VC2−VC1) in a path C2→Q2→C1, Q6 is clamped by voltage (−Vb2+Vb1−VC2) in a path BA1→Q1→C2, Q7 is clamped by voltage VC2 in a path Q8→C2, and QR1 is clamped by voltage (Vb1−VC2) in a path b1→Q1→C2→Q8.

Herein, when causing the circuit of FIG. 1 to operate as a seven-level converter circuit, in the event that the levels of Vb1 and Vb2 are set to +3E and −3E, and VC1 and VC2 are maintained at levels 1E and 2E corresponding to (⅓) and (⅔) of Vb1, the voltage of the alternating output point U is +3E, and the levels of the clamp voltages of SW1, Q4, Q5, Q6, and Q7 are E, 1E, 1E, 4E, and 2E respectively.

Meanwhile, when causing the circuit of FIG. 1 to operate as a nine-level converter circuit, in the event that the levels of Vb1 and Vb2 are set to +4E and −4E, and VC1 and VC2 are maintained at levels 1E and 2E corresponding to (¼) and (2/4) of Vb1, the voltage of the alternating current output point U is +4E, and the levels of the clamp voltages of SW1, Q4, Q5, Q6, and Q7 are 2E, 1E, 1E, 6E, and 2E respectively.

When the semiconductor switches Q1, Q2, and Q4 are turned on, and Q3, Q5, Q6, Q7, and QR1 are turned off, as in the switching pattern P2, output current, flowing along a path b1→Q1→Q2→C1→Q4→U, passes through the three semiconductor switches Q1, Q2, and Q4, and voltage (Vb1−VC1) is output to the alternating current output point U. At this time, Q3 is clamped by VC1, Q5 is clamped by voltage (VC2−VC1), Q6 is clamped by voltage (−Vb2+Vb1−VC2), Q7 is clamped by voltage VC2, and QR1 is clamped by voltage (Vb1−VC2).

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the voltage of the alternating current output point U is +2E, and the clamp voltages of SW1, Q3, Q5, Q6, and Q7 are 1E, 1E, 1E, 4E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (2/4) of Vb1, the voltage of the alternating current output point U is +3E, and the clamp voltages of SW1, Q3, Q5, Q6, and Q7 are 2E, 1E, 1E, 6E, and 2E respectively.

When the semiconductor switches Q1, Q3, and Q5 are turned on, and Q2, Q4, Q6, Q7, and QR1 are turned off, as in the switching pattern P3, output current, flowing along a path b1→Q1→C2→Q5→C1→Q3→U, passes through the three semiconductor switches Q1, Q3, and Q5, and voltage (Vb1−VC2+VC1) is output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the voltage of the alternating current output point U is +2E, and the clamp voltages of SW1, Q2, Q4, Q6, and Q7 are 1E, 1E, 1E, 4E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (2/4) of Vb1, the voltage of the alternating current output point U is +3E, and the clamp voltages of SW1, Q2, Q4, Q6, and Q7 are 2E, 1E, 1E, 6E, and 2E respectively.

When SW1, Q2, Q3, and Q8 are turned on, and Q1, Q4, Q5, Q6, and Q7 are turned off, as in the switching pattern P4, output current, flowing along a path SW1→Q8→C2→Q2→Q3→U, passes through the four semiconductor switches SW1, Q8, Q2, and Q3, and voltage (VC2) is output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the voltage of the alternating current output point U is +2E, and the clamp voltages of Q1, Q4, Q5, Q6, and Q7 are 1E, 1E, 1E, 3E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (2/4) of Vb1, the voltage of the alternating current output point U is +2E, and the clamp voltages of Q1, Q4, Q5, 6, and Q7 are 2E, 1E, 1E, 4E, and 2E respectively.

When Q1, Q4, and Q5 are tuned on, and Q2, Q3, Q6, Q7, and QR1 are turned off, as in the switching pattern P5, output current, flowing along a path b1→Q1→C2→Q5→Q4→U, passes through the three semiconductor switches Q1, Q5, and Q4, and voltage (Vb1−VC2) is output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the voltage of the alternating current output point U is +1E, and the clamp voltages of SW1, Q2, Q3, Q6, and Q7 are 1E, 1E, 1E, 4E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (2/4) of Vb1, the voltage of the alternating current output point U is +2E, and the clamp voltages of SW1, Q2, Q3, Q6, and Q7 are 2E, 1E, 1E, 4E, and 2E respectively.

When SW1, Q2, Q4, and Q8 are turned on, and Q1, Q3, Q5, Q6, and Q7 are turned off, as in the switching pattern P6, output current, flowing along a path SW1→Q8→C2→Q2→C1→Q4→U, passes through the four semiconductor switches SW1, Q8, Q2, and Q4, and voltage (VC2−VC1) is output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the voltage of the alternating current output point U is +1E, and the clamp voltages of Q1, Q3, Q5, Q6, and Q7 are 1E, 1E, 1E, 3E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (2/4) of Vb1, the voltage of the alternating current output point U is +1E, and the clamp voltages of Q1, Q3, Q5, Q6, and Q7 are 2E, 1E, 1E, 4E, and 2E respectively.

When SW1, Q3, Q5, and Q8 are turned on, and Q1, Q2, Q4, Q6, and Q7 are turned off, as in the switching pattern P7, output current, flowing along a path SW1→Q8→Q5→C1→Q3→U, passes through the four semiconductor switches SW1, Q8, Q5, and Q3, and voltage (VC1) is output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the voltage of the alternating current output point U is +1E, and the clamp voltages of Q1, Q2, Q4, Q6, and Q7 are 1E, 1E, 1E, 3E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (2/4) of Vb1, the voltage of the alternating current output point U is +1E, and the clamp voltages of Q1, Q2, Q4, Q6, and Q7 are 2E, 1E, 1E, 4E, and 2E respectively.

When SW1, Q4, Q5, and Q8 are turned on, and Q1, Q2, Q3, Q6, and Q7 are turned off, as in the switching pattern P8, output current, flowing along a path SW1→Q8→Q5→Q4→U, passes through the four semiconductor switches SW1, Q8, Q5, and Q4, and the potential of the zero terminal M is directly output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the voltage of the alternating current output point U is 0, and the clamp voltages of Q1, Q2, Q3, Q6, and Q7 are 1E, 1E, 1E, 3E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (²⁄₄) of Vb1, the voltage of the alternating current output point U is 0, and the clamp voltages of Q1, Q2, Q3, Q6, and Q7 are 2E, 1E, 1E, 4E, and 2E respectively.

When SW1, Q2, Q3, and Q7 are turned on, and Q1, Q4, Q5, Q6, and Q8 are turned off, as in the switching pattern P9, output current, flowing along a path SW1→Q7→Q2→Q3→U, passes through the four semiconductor switches SW1, Q7, Q2, and Q3, and the potential of the zero terminal is directly output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the potential of the alternating current output point U is 0, and the clamp voltages of Q1, Q4, Q5, Q6, and Q8 are 3E, 1E, 1E, 1E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (²⁄₄) of Vb1, the voltage of the alternating current output point U is 0, and the clamp voltages of Q1, Q4, Q5, Q6, and Q8 are 4E, 1E, 1E, 2E, and 2E respectively.

When SW1, Q2, Q4, and Q7 are turned on, and Q1, Q3, Q5, Q6, and Q8 are turned off, as in the switching pattern P10, output current, flowing along a path SW1→Q7→Q2→C1→Q4→U, passes through the four semiconductor switches SW1, Q7, Q2, and Q4, and voltage (VC1) is output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the potential of the alternating current output point U is −1E, and the clamp voltages of Q1, Q3, Q5, Q6, and Q8 are 3E, 1E, 1E, 1E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (²⁄₄) of Vb1, the voltage of the alternating current output point U is −1E, and the clamp voltages of Q1, Q3, Q5, Q6, and Q8 are 4E, 1E, 1E, 2E, and 2E respectively.

When SW1, Q3, Q5, and Q7 are turned on, and Q1, Q2, Q4, Q6, and Q8 are turned off, as in the switching pattern P11, output current, flowing along a path SW1→Q7→C2→Q5→C1→Q3→U, passes through the four semiconductor switches SW1, Q7, Q5, and Q3, and voltage (−VC2+VC1) is directly output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the potential of the alternating current output point U is −1E, and the clamp voltages of Q1, Q2, Q4, Q6, and Q8 are 3E, 1E, 1E, 1E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (²⁄₄) of Vb1, the voltage of the alternating current output point U is −1E, and the clamp voltages of Q1, Q2, Q4, Q6, and Q8 are 4E, 1E, 1E, 2E, and 2E respectively.

When Q2, Q3, and Q6 are turned on, and Q1, Q4, Q5, Q8, and QR2 are turned off, as in the switching pattern P12, output current, flowing along a path b2→Q6→C2→Q2→Q3→U, passes through the three semiconductor switches Q6, Q2, and Q3, and voltage (Vb2+VC2) is directly output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the potential of the alternating current output point U is −1E, and the clamp voltages of SW1, Q1, Q4, Q5, and Q8 are 1E, 4E, 1E, 1E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (²⁄₄) of Vb1, the voltage of the alternating current output point U is −2E, and the clamp voltages of SW1, Q1, Q4, Q5, and Q8 are 2E, 6E, 1E, 1E, and 2E respectively.

When SW1, Q4, Q5, and Q7 are turned on, and Q1, Q2, Q3, Q6, and Q8 are turned off, as in the switching pattern P13, output current, flowing along a path SW1→Q7→C2→Q5→Q4→U, passes through the four semiconductor switches SW1, Q7, Q5, and Q4, and voltage (−VC2) is directly output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the potential of the alternating current output point U is −2E, and the clamp voltages of Q1, Q2, Q3, Q6, and Q8 are 3E, 1E, 1E, 1E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (²⁄₄) of Vb1, the voltage of the alternating current output point U is −2E, and the clamp voltages of SW1, Q1, Q2, Q3, Q6, and Q8 are 4E, 1E, 1E, 2E, and 2E respectively.

When Q2, Q4, and Q6 are turned on, and Q1, Q3, Q5, Q8, and QR2 are turned off, as in the switching pattern P14, output current, flowing along a path b2→Q6→C2→Q2→C1→Q4→U, passes through the three semiconductor switches Q6, Q2, and Q4, and voltage (Vb2+VC2−VC1) is directly output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the potential of the alternating current output point U is −2E, and the clamp voltages of SW1, Q1, Q3, Q5, and Q8 are 1E, 4E, 1E, 1E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (²⁄₄) of Vb1, the voltage of the alternating current output point U is −3E, and the clamp voltages of SW1, Q1, Q3, Q5, and Q8 are 2E, 6E, 1E, 1E, and 2E respectively.

When Q3, Q5, and Q6 are turned on, and Q1, Q2, Q4, Q8, and QR2 are turned off, as in the switching pattern P15, output current, flowing along a path b2→Q6→Q5→C1→Q3→U, passes through the three semiconductor switches Q6, Q5, and Q3, and voltage (Vb2+VC1) is directly output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the potential of the alternating current output point U is −2E, and the clamp voltages of SW1, Q1, Q2, Q4, and Q8 are 1E, 4E, 1E, 1E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (²⁄₄) of Vb1, the voltage of the alternating current output point U is −3E, and the clamp voltages of SW1, Q1, Q2, Q4, and Q8 are 2E, 6E, 1E, 1E, and 2E respectively.

When Q4, Q5, and Q6 are turned on, and Q1, Q2, Q3, Q8, and QR2 are turned off, as in the switching pattern P16, output current, flowing along a path b2→Q6→Q5→Q4→U, passes through the three semiconductor switches Q6, Q5, and Q4, and voltage (Vb2) is directly output to the alternating current output point U.

Herein, when causing the circuit of FIG. 1 to operate as the seven-level converter circuit, in the event that the levels of Vb1 and Vb2 are set to +3E and −3E, and VC1 and VC2 are maintained at levels 1E and 2E corresponding to (⅓) and (⅔) of Vb1, the potential of the alternating current output point U is 3E, and the clamp voltages of SW1, Q1, Q2, Q3, and Q8 are 1E, 4E, 1E, 1E, and 2E respectively.

Meanwhile, when causing the circuit of FIG. 1 to operate as the nine-level converter circuit, in the event that the levels of Vb1 and Vb2 are set to +4E and −4E, and VC1 and VC2 are maintained at levels 1E and 2E corresponding to (¼) and (²⁄₄) of Vb1, the voltage of the alternating current output point U is −4E, and the clamp voltages of SW1, Q1, Q2, Q3, and Q8 are 2E, 6E, 1E, 1E, and 2E respectively.

When both Vb1 and Vb2 in FIG. 1 are +3E as the seven-level converter circuit, seven levels of voltages, +3E, +2E, +1E, 0, −1E, −2E, and −3E, can be output to the alternating current output point U in accordance with the switching patterns P1 to P16, and in the same way, when both Vb1 and Vb2 in FIG. 1 are +4E as the seven-level converter circuit, nine levels of voltages, +4E, +3E, +2E, +1E, 0, −1E, −2E, −3E, and −4E, can be output to the alternating current output point U in accordance with the switching patterns P1 to P16.

Also, when the circuit of FIG. 1 operates as the seven-level converter circuit, the same +2E is output in the switching patterns P2 to P4, but when the direction of alternating current output current i from the alternating current output point U is positive, the capacitor C1 is charged in the switching pattern P2. As opposed to this, the capacitor C1 is discharged, and the capacitor C2 is charged, in the switching pattern P3, while the capacitor C2 is discharged in the switching pattern P4. With regard to the switching patterns P5 to P7 when the output voltage of the alternating current output point U is +1E too, C2 is charged in the switching pattern P5, C1 is charged, while C2 is discharged, in the switching pattern P6, and C1 is discharged in the switching pattern P7, in accordance with the direction of the alternating current output current i.

That is, by appropriately selecting from the switching patterns P2 to P4 in order to output the voltage of +2E to the alternating current output point U, and the switching patterns P5 to P7 in order to output the voltage of +1E to the alternating current output point U, it is possible to adjust VC1 and VC2 independently of each other, and it is possible to always control each of VC1 and VC2 to +1E and +2E.

From the symmetry of the circuit, the same relationship is established in the switching patterns P10 and P15 too. Also, when in the switching patterns P1, P8, P9, and P16, as no current flows through the capacitor C1 or C2, no change occurs in VC1 or VC2. FIGS. 2 and 3 show an output waveform diagram when the circuit of FIG. 1 is caused to operate as the seven-level converter circuit, and an example of the switching patterns P1 to P16, respectively.

Next, when causing the circuit of FIG. 1 to operate as the nine-level converter circuit, the voltage of +3E is output to the alternating current output point U in both the switching patterns P2 and P3, but +2E is output in the switching patterns P4 and P5, and +1E is output in the switching patterns P6 and P7.

Herein, considering a case in which the direction of the alternating current output current i from the alternating current output point U is positive, the capacitor C1 is charged by the alternating current output current i in the switching pattern P2 when outputting +3E, while the capacitor C1 is discharged, and the capacitor C2 is charged, in the switching pattern P3.

Also, C2 is discharged in the switching pattern P4 when outputting +2E, and C2 is charged in the switching pattern P5. Also, C1 is charged, and C2 is discharged, in the switching pattern P6 when outputting +1E, while C1 is discharged in the switching pattern P7.

That is, by appropriately selecting the switching patter P2 or P3 when outputting the voltage of +3E to the alternating current output point U, the switching patter P4 or P5 when outputting the voltage of +2E, and the switching pattern P6 or P7 when outputting the voltage of +1E, it is possible to adjust VC1 and VC2 independently of each other, and it is possible to always control each of VC1 and VC2 to +1E and +2E.

Figure 4:
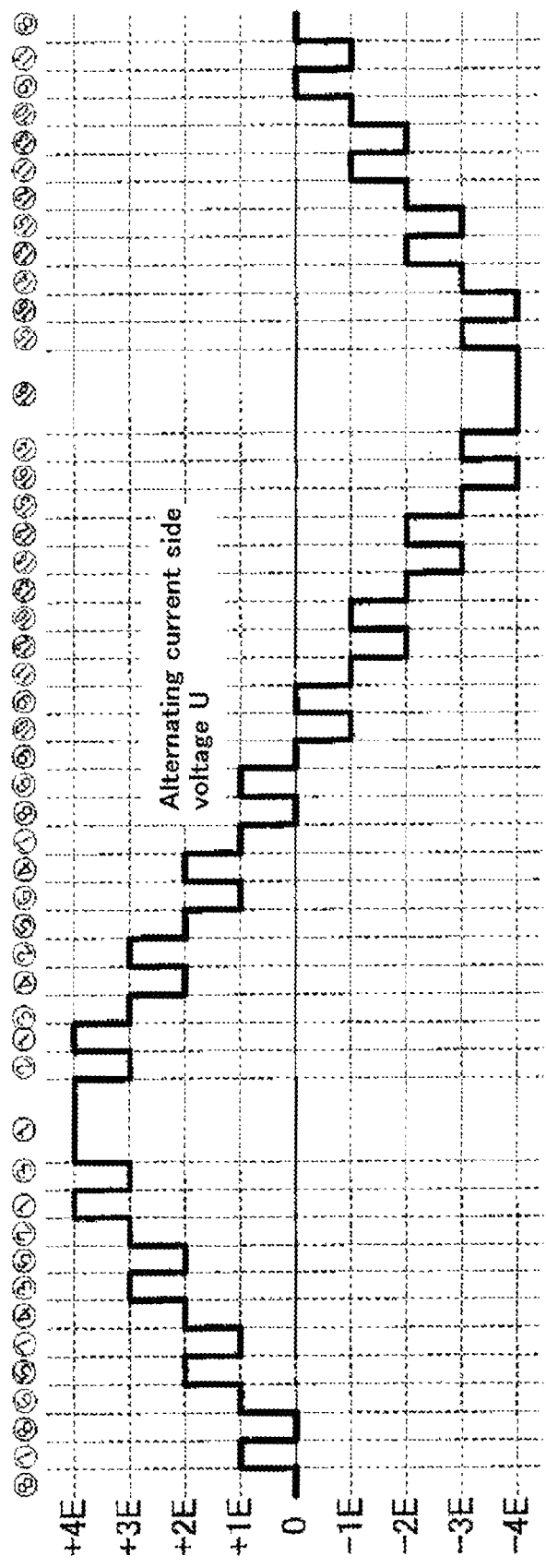
FIG. 4 is a waveform diagram showing an output voltage example when an embodiment of FIG. 1 is caused to operate as a nine-level converter circuit.

From the symmetry of the circuit, the same relationship is established in the switching patterns P10 and P15 too. Also, when in the switching patterns P1, P8, P9, and P16, as no current flows through the capacitor C1 or C2, no change occurs in VC1 or VC2. FIGS. 4 and 5 show an output waveform diagram when causing the circuit of FIG. 1 to operate as the nine-level converter circuit, and an example of the switching patterns P1 to P16, respectively.

Figure 6:
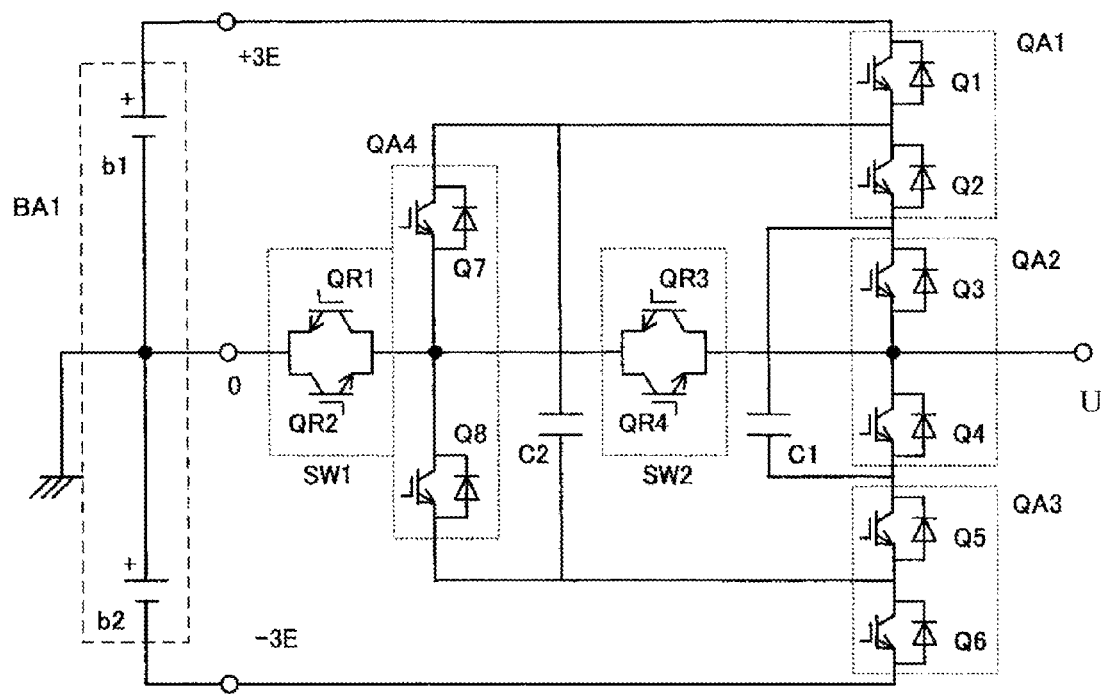
FIG. 6 is a circuit diagram showing a first modification example of an embodiment of FIG. 1.

FIG. 6 is a circuit diagram showing a first modification example of FIG. 1. The difference from FIG. 1 is that an alternating current switch SW2 is added between the neutral terminal of the arm pair QA4 and the neutral terminal of the arm pair QA2.

When causing this circuit as the seven-level converter circuit, in all the modes other than the switching patterns P8 and P9, the operations of the semiconductor switches Q1 to Q8 and SW1 are quite the same as in the case of FIG. 1. The operations of QR3 and QR4 of the added alternating current switch SW2 are such that QR3 is turned off, and QR4 is turned on, in the switching patterns P1 to P7, and conversely, QR3 is turned on, and QR4 is turned off, in the switching patterns P10 to P16.

In any of the heretofore described switching patterns, as no current is caused to flow through the alternating switch SW2, and the alternating switch SW2 is clamped by the voltage VC1 or VC2, and maintains a standby state, there is no effect on the operation of the whole of the circuit. Only when outputting 0 in the switching patterns P8 and P9, QR3 and QR4 are both turned on, thus allowing output current to flow through SW2. That is, as the current, flowing from the zero terminal M of BA1 along a path SW1→SW2→U, passes through only the two semiconductor switches SW1 and SW2, it is possible to reduce semiconductor conduction loss as compared with the circuit of FIG. 1, and thus possible to hope for higher efficiency.

FIG. 7 shows an example of switching patterns when causing the circuit of FIG. 6 to operate as the seven-level converter circuit.

Figure 8:
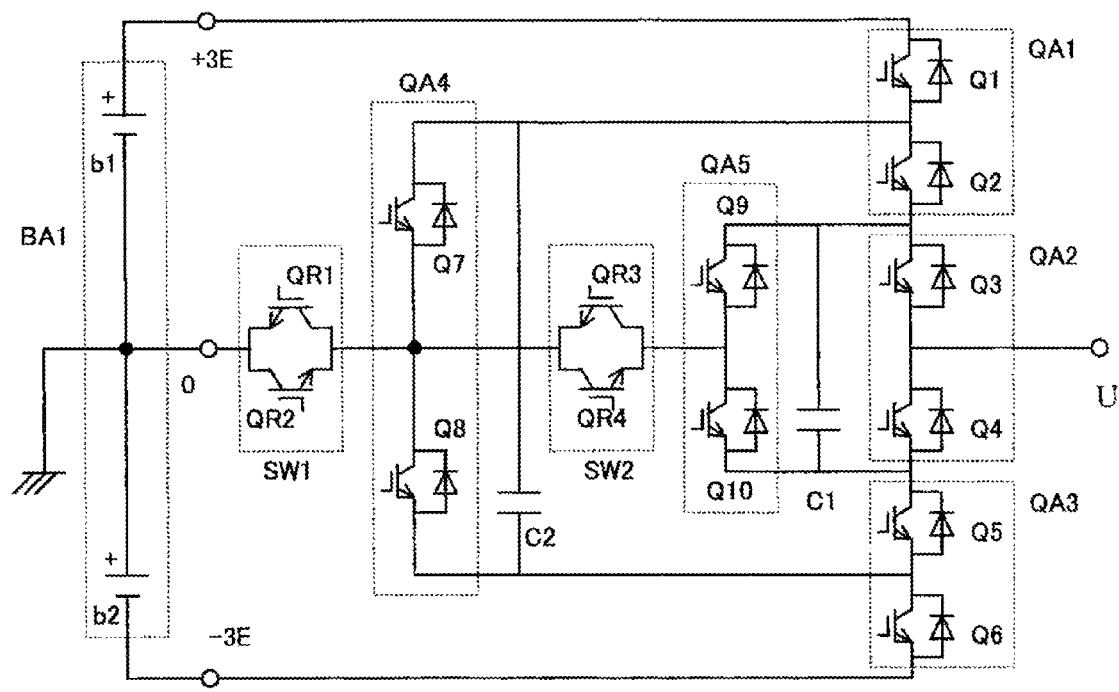
FIG. 8 is a circuit diagram showing a second modification example of an embodiment of FIG. 1.

FIG. 8 is a circuit diagram showing a second modification example of FIG. 1. The difference from FIG. 1 is that an arm pair QA5 is additionally connected in parallel to QA2, and an alternating current switch SW2 is additionally connected between the midpoint terminal of the arm pair QA4 and the midpoint terminal of QA5. When causing the circuit of FIG. 8 to operate as the seven-level converter circuit, in all the modes other than the switching patterns P7 to P10, the operations of the semiconductor switches Q1 to Q8 and SW1 are quite the same as in the case of FIG. 1. The operations of QR3 and QR4 of the added SW2 and of Q9 and Q10 of the added QA5 are such that QR3 is turned off, QR4 is turned on, Q9 is turned off, and Q10 is turned on, in the switching patterns P1 to P6. Also, QR3 is turned on, QR4 is turned off, Q9 is turned on, and Q10 is turned off, in the switching patterns P11 to P16. In any of the switching patterns, as no current is caused to flow through the added SW2 and QA5, and SW2 and QA5 are clamped by VC1 and voltage (VC2−VC1) respectively, and maintained in a standby state, there is no effect on the operation of the whole of the circuit.

In the circuit of FIG. 8, when in the switching pattern P7, SW1, SW2, Q3, and Q10 are turned on, output current, flowing along a path SW1→SW2→Q10→C1→Q3, passes through the four semiconductor switches, and VC1 is directly output to the alternating current output point U. In the switching pattern P8, SW1, SW2, Q4, and Q10 are turned on, output current, flowing along a path SW1→SW2→Q10→Q4, passes through the four semiconductor switches, and the potential 0 of the zero terminal of BA1 is directly output to the alternating current output point U. In the switching pattern P9, SW1, SW2, Q3, and Q9 are turned on, output current, flowing along a path SW1→SW2→Q9→Q3, passes through the four semiconductor switches, and the potential 0 of the zero terminal of BA1 is directly output to the alternating current output point U. Also, in the switching pattern P10, SW1, SW2, Q4, and Q9 are turned on, output current, flowing along a path SW1→SW2→Q9→C1→Q4, passes through the four semiconductor switches, and −VC1 is directly output to the alternating current output point U.

As above, in any of the switching patterns P7 to P10, the output current passes through four semiconductor switches, and in terms of number, the circuit of FIG. 8 is equivalent to the circuit of FIG. 1. In the circuit of FIG. 1, it is always necessary for the output current to pass through the arm pair QA4 (Q7 and Q8), and breakdown voltage characteristics which can withstand the voltage of 2E are required of this QA4 when in operation. As opposed to this, in FIG. 8, semiconductor switches through which the output current passes are SW1, SW2, QA5, and QA2, and breakdown voltage required of all these semiconductor switches is 1E. Because of this, with the circuit of FIG. 8, it is possible to hope for higher efficiency as compared with the circuit of FIG. 1. FIG. 9 shows an operation pattern example of FIG. 8.

Figure 10:
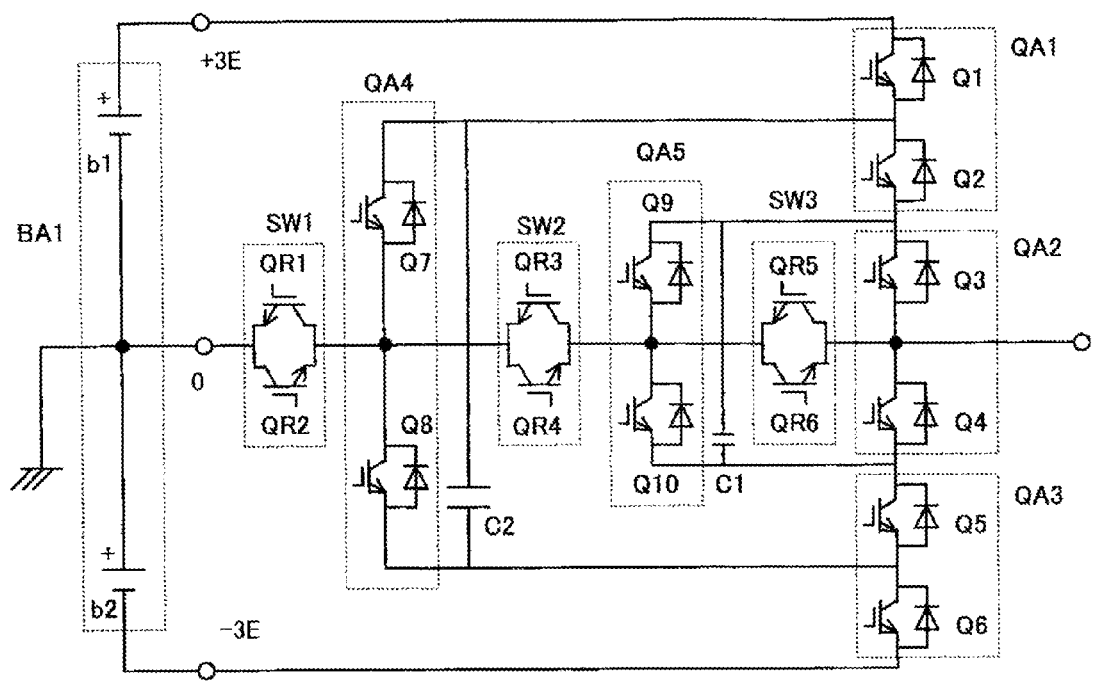
FIG. 10 is a circuit diagram showing a third modification example of an embodiment of FIG. 1.

FIG. 10 is a third modification example of FIG. 1, wherein one portion of FIG. 8 is changed. The difference from FIG. 8 is that an alternating current switch SW3 is added between the neutral terminal of the arm pair QA5 and the neutral terminal of QA2.

With regard to operations in FIG. 10, in all the modes other than the switching patterns P8 and P9, the operations of the semiconductor switches Q1 to Q10, SW1, and SW2 are quite the same as in the case of FIG. 8. The operations of QR5 and QR6 of the added SW3 are such that QR5 is turned off, and QR6 is turned on, in the switching patterns P1 to P7, while QR5 is turned on, and QR6 is turned off, in the switching patterns P10 to P16, thus setting the operations to be in the reverse relation between in the switching patterns P1 to P7 and P10 to P16.

In any of the heretofore described modes, as no current is caused to flow through the added SW3, and SW3 is clamped by VC1 or voltage 0, and maintained in a standby state, there is no effect on the operation of the whole of the circuit. Only in the switching patterns P8 and P9 in which voltage 0 is output, QR5 and QR6 are both turned on, and current flows through SW3. At this time, output current, flowing from the zero terminal M of BA1 along a path SW1→SW2→SW3→U, passes through only the three semiconductor switches SW1, SW2, and SW3, meaning that semiconductor conduction loss decreases as compared with the circuits of FIGS. 1 and 8, and it is possible to hope for higher efficiency. FIG. 11 shows operation patterns in FIG. 10.

Figure 12:
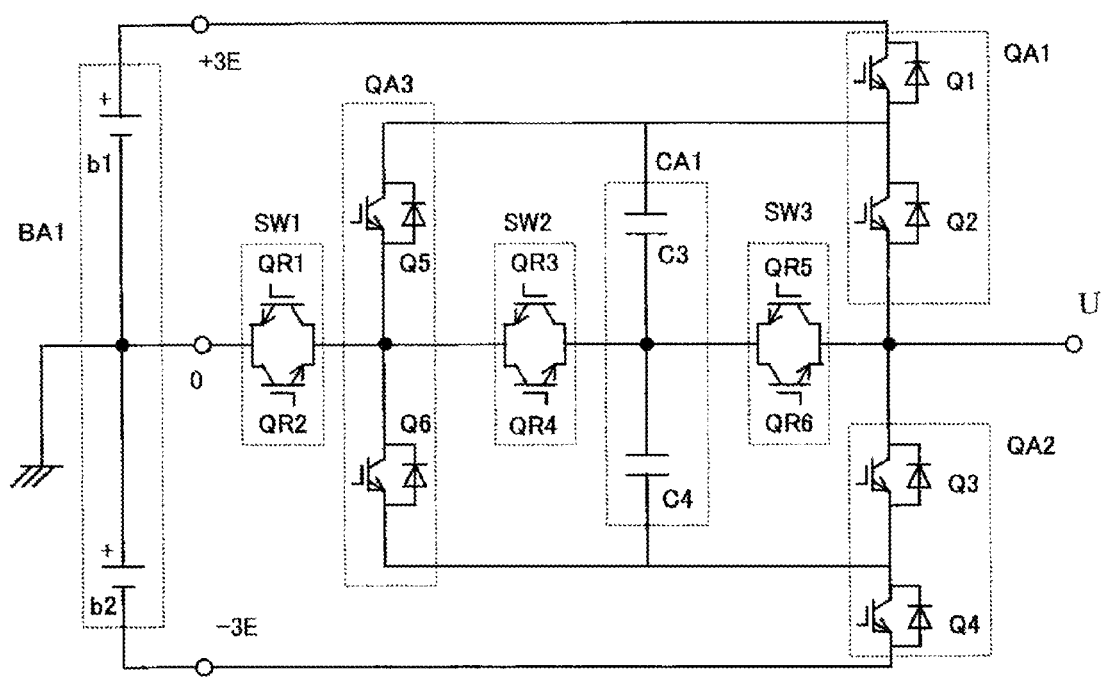
FIG. 12 is a circuit diagram showing another embodiment of the invention.

FIG. 12 shows another embodiment of the invention.

Herein, a direct current combined power source BA1, with direct current power sources b1 and b2, each having the voltage of 3E, connected in series, which has three terminals, a positive terminal, a zero terminal, and a negative terminal, is connected as a direct current side power source. In this multilevel converter circuit, a series circuit of an arm pair QA1 formed of semiconductor switches Q1 and Q2, and an arm pair QA2 formed of semiconductor switches Q3 and Q4, is connected between the positive terminal and negative terminal of the direct current combined power source BA1. Also, the outer side terminals of an arm pair QA3 formed of semiconductor switches Q5 and Q6 are connected between the midpoint terminal of the arm pair QA1 and the midpoint terminal of the arm pair QA2, and an alternating current switch SW1 formed of an inverse parallel circuit of semiconductor switches QR1 and QR2 having reverse breakdown voltage characteristics is connected between the midpoint terminal of the arm pair QA3 and the zero terminal of the direct current combined power source BA1.

Also, a capacitor series circuit CA1, wherein capacitors C3 and C4 are connected in series, is connected in parallel to the arm pair QA3, an alternating current switch SW2 formed of an inverse parallel circuit of semiconductor switches QR3 and QR4 having reverse breakdown voltage characteristics is connected between the midpoint terminal of the capacitor series circuit CA1 and the midpoint terminal of the arm pair QA3, an alternating current switch SW3 formed of an inverse parallel circuit of semiconductor switches QR5 and QR6 having reverse breakdown voltage characteristics is connected between the midpoint terminal of the capacitor series circuit CA1 and the connection point of the arm pair QA1 and arm pair QA2, and the connecting point of QA1, QA2, and SW3 forms an alternating current output point U.

The circuit of FIG. 12 operates in the following way in accordance with kinds of switching patterns P1' to P13' in FIG. 13.

Firstly, when the semiconductor switches Q1, Q2, and Q6 are turned on, and Q3, Q4, Q5, QR1, QR3, and QR5 are turned off, as in the switching pattern P1', voltage Vb1 of the positive terminal of the direct current combined power source BA1 is directly output to the alternating current output point U. Output current, flowing along a path b1→Q1→Q2→U, passes through the two semiconductor switches Q1 and Q2. At this time, SW3 is clamped by voltage VC3 of C3 in the path of C3 and Q2, SW2 is clamped by voltage VC4 of C4 in the path of Q6 and C4, and SW1 is clamped by voltage (Vb1−VC3−VC4) in the path of b1, Q1, C3, C4, and Q6.

In the same way, Q3 is clamped by voltage (VC3+VC4) in the path of C4, C3, and Q2, Q4 is clamped by voltage (−Vb2+Vb1−VC3−VC4) in the path of b2, b1, C3, and C4, and Q5 is clamped by voltage (VC3+VC4) in the path of Q6, C4, and C3.

Herein, in the event that VC3 and VC4 are both controlled to a level 1E corresponding to (⅓) of Vb1 by using the direct current power source BA1 wherein the levels of Vb1 and Vb2 are +3E and −3E respectively, the levels of the clamp voltages of Q3, Q4, Q5, SW1, SW2, and SW3 are 2E, 4E, 2E, 1E, 1E, and 1E respectively.

When the semiconductor switches Q1, Q6, and SW3 are turned on, and Q2, Q3, Q4, Q5, QR1, and QR3 are turned off, as in the switching pattern P2', output current, flowing along a path b1→Q1→C3→SW3→U, passes through the two semiconductor switches Q1 and SW3, and voltage (Vb1−VC3) is output to the alternating current output point U. At this time, Q2 is clamped by VC3, Q3 is clamped by VC4, Q4 is clamped by (Vb1−VC3−VC4), Q5 is clamped by (VC3+VC4), SW1 is clamped by (Vb1−VC3−VC4), and SW2 is clamped by the voltage VC3 of VC4.

Also, in the event that the levels of Vb1 and Vb2 are +3E and −3E respectively, and VC3 and VC4 are both controlled to a level 1E corresponding to (⅓) of Vb1, the potential of the alternating current output point U is +2E, and the clamp voltages of SW1, SW2, Q2, Q3, Q4, and Q5 are 1E, 1E, 1E, 1E, 4E, and 2E respectively.

When the semiconductor switches Q2, Q6, QR1, and QR2 are turned on, and Q1, Q3, Q4, Q5, QR3, and QR5 are turned off, as in the switching pattern P3', output current, flowing along a path SW1→Q6→C4→C3→Q2→U, passes through the three semiconductor switches SW1, Q6, and Q2, and voltage (VC3+VC4) is output to the alternating current output point U.

At this time, in the event that the levels of Vb1 and Vb2 are +3E and −3E respectively, and VC1 and VC2 are both controlled to a level 1E corresponding to (⅓) of Vb1, the potential of the alternating current output point U is +2E, and the clamp voltages of SW1, SW2, Q1, Q3, Q4, and Q5 are 1E, 1E, 1E, 2E, 3E, and 2E respectively.

When the semiconductor switches Q1, Q3, and Q6 are turned on, and Q2, Q4, Q5, QR1, QR3, and QR6 are turned off, as in the switching pattern P4', output current, flowing along a path b1→Q1→C3→C4→Q3→U, passes through the two semiconductor switches Q1 and Q3, and voltage (Vb1−VC3−VC4) is output to the alternating current output point U.

At this time, in the event that the levels of Vb1 and Vb2 are +3E and −3E respectively, and VC1 and VC2 are both controlled to a level 1E corresponding to (⅓) of Vb1, the potential of the alternating current output point U is +1E, and the clamp voltages of SW1, SW2, SW3, Q2, Q4, and Q5 are 1E, 1E, 1E, 2E, 4E, and 2E respectively.

When SW1, SW2 and Q2 are turned on, and Q1, Q3, Q4, Q5, Q6, and QR5 are turned off, as in the switching pattern P5', output current, flowing along a path SW1→SW2→C3→Q2→U, passes through the three semiconductor switches SW1, SW2, and Q2, and voltage (VC3) is output to the alternating current output point U.

At this time, in the event that the levels of Vb1 and Vb2 are +3E and −3E respectively, and VC1 and VC2 are both controlled to a level 1E corresponding to (⅓) of Vb1, the potential of the alternating current output point U is +1E, and the clamp voltages of SW3, Q1, Q3, Q4, Q5, and Q6 are 1E, 2E, 2E, 2E, 1E, and 1E respectively.

When SW1, SW3, and Q6 are turned on, and Q1, Q2, Q3, Q4, Q5, and QR3 are turned off, as in the switching pattern P6', output current, flowing along a path SW1→Q6→C4→SW3→U, passes through the three semiconductor switches SW1, Q6 and SW3 and voltage (VC4) is output to the alternating current output point U.

At this time, in the event that the levels of Vb1 and Vb2 are +3E and −3E respectively, and VC1 and VC2 are both controlled to a level 1E corresponding to (⅓) of Vb1, the potential of the alternating current output point U is +1E, and the clamp voltages of SW2, Q1, Q2, Q3, Q4, and Q5 are 1E, 1E, 1E, 1E, 3E, and 2E respectively.

When SW1, SW2 and SW3 are turned on, and Q1, Q2, Q3, Q4, Q5, and Q6 are turned off, as in the switching pattern P8', output current, flowing along a path SW1→SW2→SW3→U, passes through the three semiconductor switches SW1, SW2, and SW3, and the potential 0 of the zero terminal M is output to the alternating current output point U.

At this time, in the event that the levels of Vb1 and Vb2 are +3E and −3E respectively, and VC1 and VC2 are both controlled to a level 1E corresponding to (⅓) of Vb1, the potential of the alternating current output point U is +1E, and the clamp voltages of Q1, Q2, Q3, Q4, Q5 and Q6 are 2E, 1E, 1E, 2E, 1E, and 1E respectively.

As the respective operations in the switching pattern P7' to the switching pattern P13' are the same as those in the switching pattern P1' to the switching pattern P6' from the symmetry of the circuit, a description will be omitted.

In accordance with the switching pattern P1' to the switching pattern P13', it is possible to output seven levels of voltages, 3E, 2E, 1E, 0, −1E, −2E, and −3E, to the alternating current output point U. Herein, the same +2E is output in the switching patterns P2' and P3', but considering an active power output time at which the direction of alternating current output current i from the alternating current output point U is the same, the capacitor C3 is charged at the current i in P2', and the capacitors C3 and C4 are both discharged at the current i in P2.

Also, with regard to P4' to P6' when +1E is output to the alternating current output point U, the capacitors C3 and C4 are both discharged in P4', the capacitor C3 is discharged in P5', and the capacitor C4 is discharged in P6', at the alternating current output current i.

In the same way, with regard to P8' to P10' when −1E is output to the alternating current output point U, the capacitor C3 is discharged in P8', the capacitor C4 is discharged in P9', and the capacitors C3 and C4 are both charged in P10', at the alternating current output current i.

With regard to P11' and P12' when −1E is output to the alternating current output point U, the capacitors C3 and C4 are both discharged in P11', and the capacitor C4 is charged in P12'.

From the above, by appropriately selecting the switching patterns P2' and P3' when outputting the voltage of +2E to the alternating current output point U, P4' to P6' when outputting the voltage of +1E, P8' to P10' when outputting the voltage of −1E, and P11' and P12' when outputting the voltage of −2E, it is possible to adjust VC3 and VC4, and it is possible to always maintain VC3 and VC4 at 1E. Also, in the switching patterns P1', P7', and P13', as no current flows through the capacitor C3 or C4, no change occurs in VC3 or VC4. FIG. 13 shows operation patterns of the circuit of FIG. 12.

Figure 14:
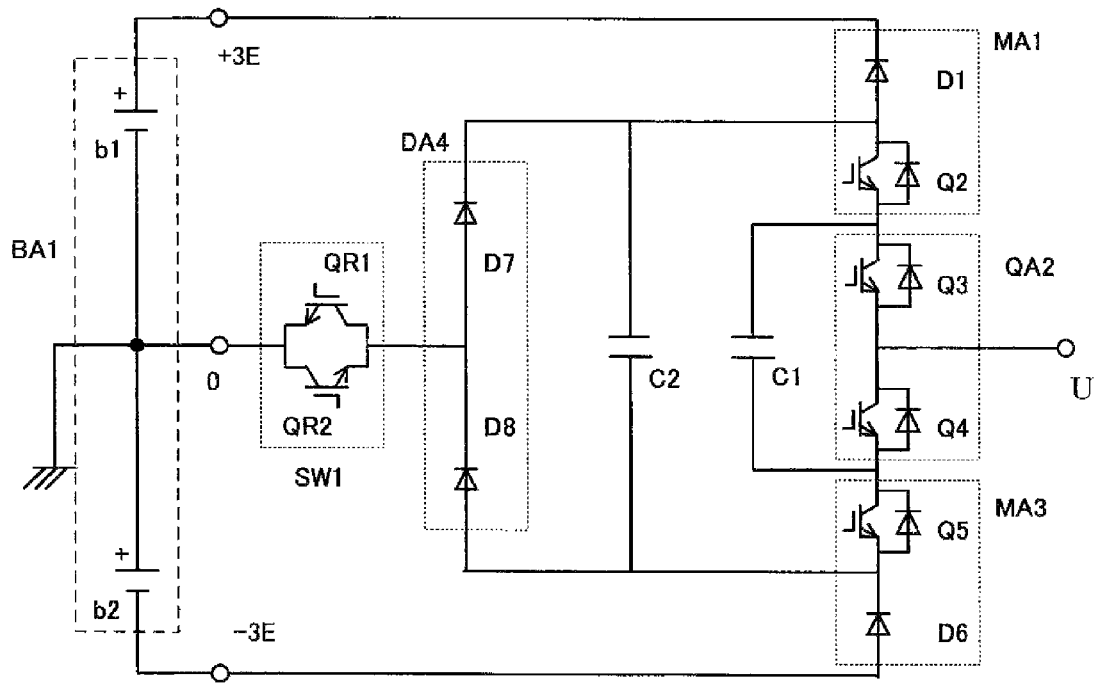
FIG. 14 is a circuit diagram showing a fourth modification example of an embodiment of FIG. 1.

FIG. 14 shows a fourth modification example of FIG. 1. The difference from FIG. 1 is that the semiconductor switches Q1, Q6, Q7, and Q8 are changed to diodes D1, D6, D7, and D8 respectively.

In the circuit of FIG. 1, both an inverter operation which converts direct current to alternating current and a rectifier operation which converts alternating current to direct current are possible, but if limited to only the rectifier operation, it is possible to apply the circuit of FIG. 14. In the circuit of FIG. 14, as inexpensive diodes are used in place of controllable semiconductor switches such as Q1, Q6, Q7, and Q8, price reduction is possible.

A description will hereafter be given of a case of causing FIG. 14 to operate as a seven-level converter.

"In the case of the switching pattern P1"

In this case, the alternating current voltage is +3E, and the path of current is U→Q3→Q2→D1→b1.

"In the case of the switching pattern P2"

In this case, the alternating current voltage is +2E, and the path of current is U→Q4→C1→Q2→D1→b1.

"In the case of the switching pattern P3"

In this case, the alternating current voltage is +2E, and the path of current is U→Q3→C1→Q5→C2→D1→b1.

"In the case of the switching pattern P4"

In this case, the alternating current voltage is +2E, and the path of current is U→Q3→Q2→C2→D8→SW1.

"In the case of the switching pattern P5"

In this case, the alternating current voltage is +1E, and the path of current is U→Q4→Q5→C2→D1→b1.

"In the case of the switching pattern P6"

In this case, the alternating current voltage is +1E, and the path of current is U→Q4→C1→Q2→C2→D8→SW1.

"In the case of the switching pattern P7"

In this case, the alternating current voltage is +1E, and the path of current is U→Q3→C1→Q5→D8→SW1.

"In the case of the switching pattern P8"

In this case, the alternating current voltage is 0, and the path of current is U→Q4→Q5→D8→SW1.

"In the case of the switching pattern P9"

In this case, the alternating current voltage is 0, and the path of current is SW1→D7→Q2→Q3→U.

Hereafter, as the operations are the same as heretofore described in the switching patterns P10 to P16 too from the symmetry of the circuit, a description will be omitted.

Figure 15:
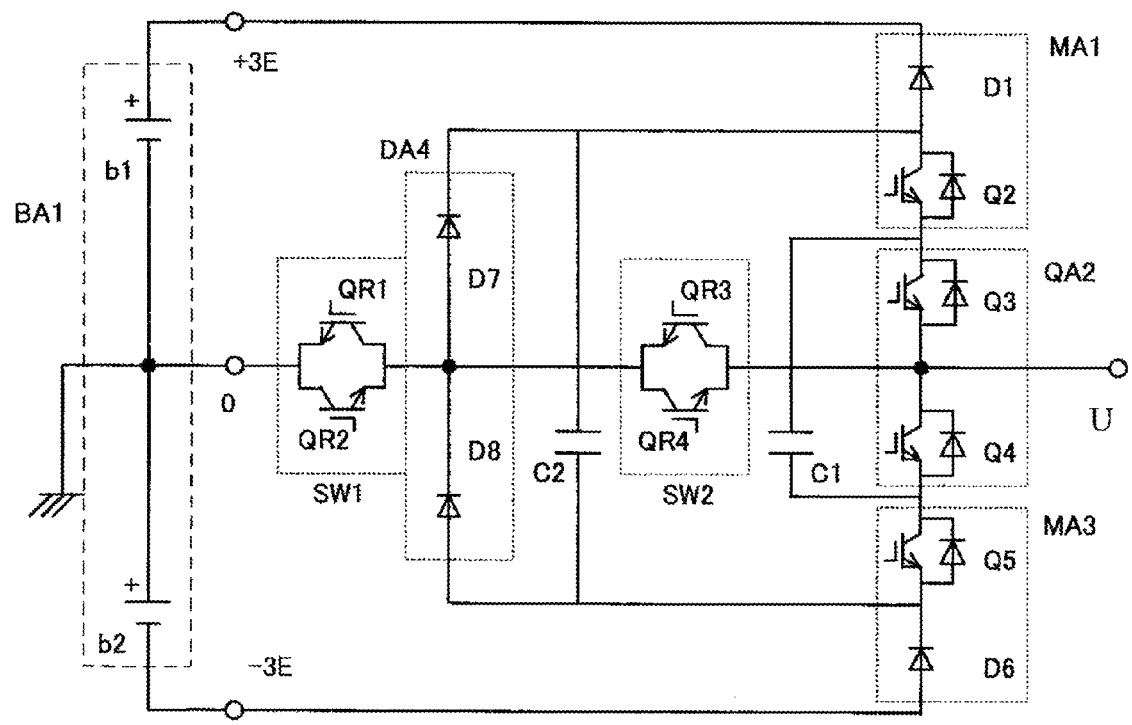
FIG. 15 is a circuit diagram showing a fifth modification example of an embodiment of FIG. 1.

FIG. 15 shows a fifth modification example of FIG. 1. As this example is such that an alternating current switch SW2 is added to FIG. 14, a description will be omitted.

Figure 16:
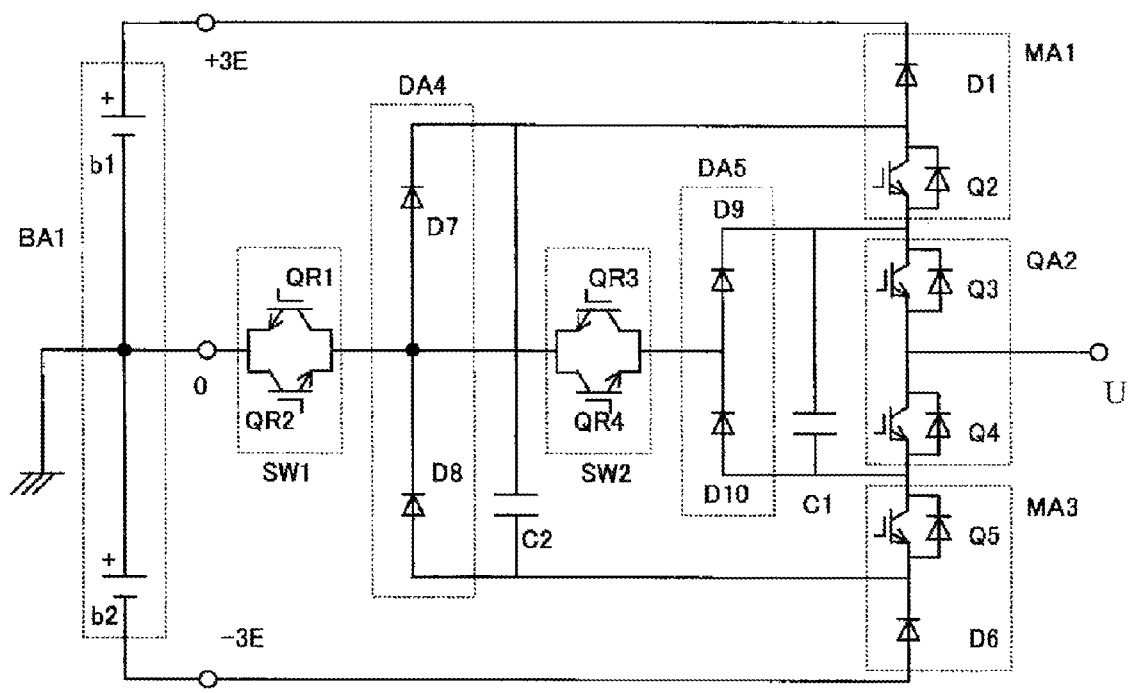
FIG. 16 is a circuit diagram showing a sixth modification example of an embodiment of FIG. 1.

FIG. 16 is a sixth modification example of FIG. 1, and a modification example of FIG. 8 too. The difference from FIG. 8 is that the semiconductor switches Q1, Q6, Q7, Q8, Q9, and Q10 are changed to diodes D1, D6, D7, D8, D9, and D10 respectively.

In the circuit of FIG. 8, an inverter operation which converts direct current to alternating current and a rectifier operation which converts alternating current to direct current are both possible, but if limited to only the rectifier operation, it is possible to apply the circuit of FIG. 16. In the circuit of FIG. 16, as inexpensive diodes are used in place of controllable semiconductor switches such as Q1, Q6, Q7, and Q8, price reduction is possible.

As the operations of FIG. 16 is the same as those of FIG. 14 in the switching patterns P1 to P6, a description will be omitted.

In the switching pattern P7, the alternating current voltage is +1E, and the path of current is U→Q3→C1→D10→SW2→SW1.

In the switching pattern P8, the alternating current voltage is 0, and the path of current is U→Q4→D10→SW2→SW1.

In the switching pattern P9, the alternating current voltage is 0, and the path of current is SW1→SW2→D9→Q3→U.

Hereafter, as the operations are the same as heretofore described in the switching patterns P10 to P16 too from the symmetry of the circuit, a description will be omitted.

Figure 17:
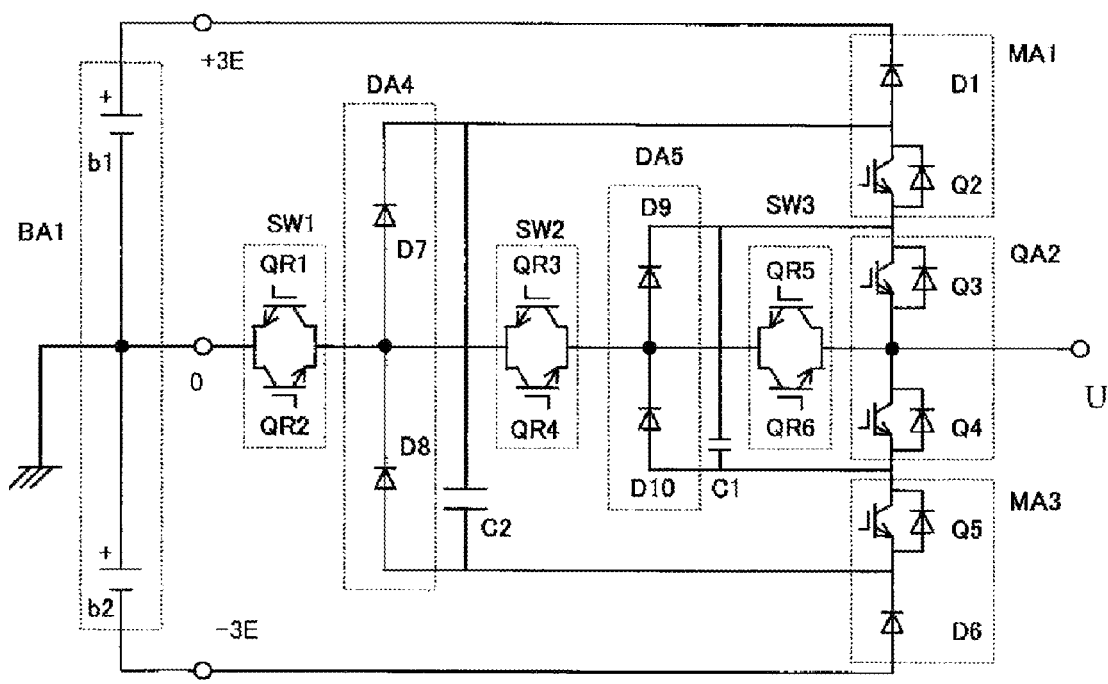
FIG. 17 is a circuit diagram showing a seventh modification example of an embodiment of FIG. 1.

FIG. 17 is a seventh modification example of FIG. 1, and a modification example of FIG. 16 too. That is, as this example is such that an alternating current switch SW3 is added to FIG. 16, a description will be omitted. The switching patterns P1 to P16 used in FIGS. 14, 15, 16, and 17 are the same as their respective switching patterns P1 to P16 shown in FIGS. 3, 7, 9, and 11.

Figure 18:
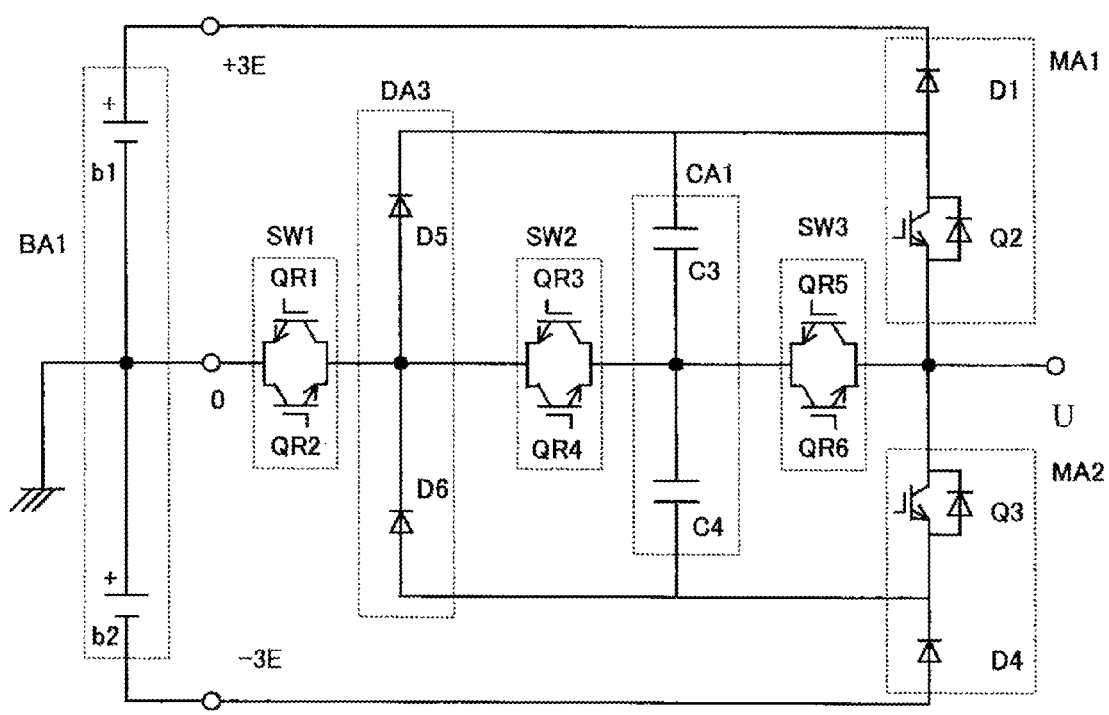
FIG. 18 is a circuit diagram showing a first modification example of an embodiment of FIG. 12.

FIG. 18 is a first modification example of FIG. 12. The difference from FIG. 12 is that the semiconductor switches Q1, Q4, Q5, and Q6 are changed to diodes D1, D4, D5, and D6 respectively.

In the circuit of FIG. 12, an inverter operation which converts direct current to alternating current and a rectifier operation which converts alternating current to direct current are both possible, but if limited to only the rectifier operation, it is possible to apply the circuit of FIG. 18. In the circuit of FIG. 18, as inexpensive diodes are used in place of controllable semiconductor switches such as Q1, Q4, Q5, and Q6, price reduction is possible.

Herein, a description will be given of the operations. Herein, it is taken to use the same switching patterns P1' to P13' as those of FIG. 13.

In the switching pattern P1', the alternating current voltage is +3E, and the path of current is U→Q2→D1→b1.

In the switching pattern P2', the alternating current voltage is +2E, and the path of current is U→SW3→C3→D1→b1.

In the switching pattern P3', the alternating current voltage is +2E, and the path of current is U→Q2→C3→C4→D6→SW1.

In the switching pattern P4', the alternating current voltage is +1E, and the path of current is U→Q3→C4→C3→D1→b1.

In the switching pattern P5', the alternating current voltage is +1E, and the path of current is U→Q2→C3→SW2→SW1.

In the switching pattern P6', the alternating current voltage is +1E, and the path of current is U→SW3→C4→D6→SW1.

In the switching pattern P7', the alternating current voltage is 0, and the path of current is U→SW3→SW2→SW1.

Hereafter, as the operations are the same as heretofore described in the switching patterns P8' to P13' too from the symmetry of the circuit, a description will be omitted.

Figure 19:
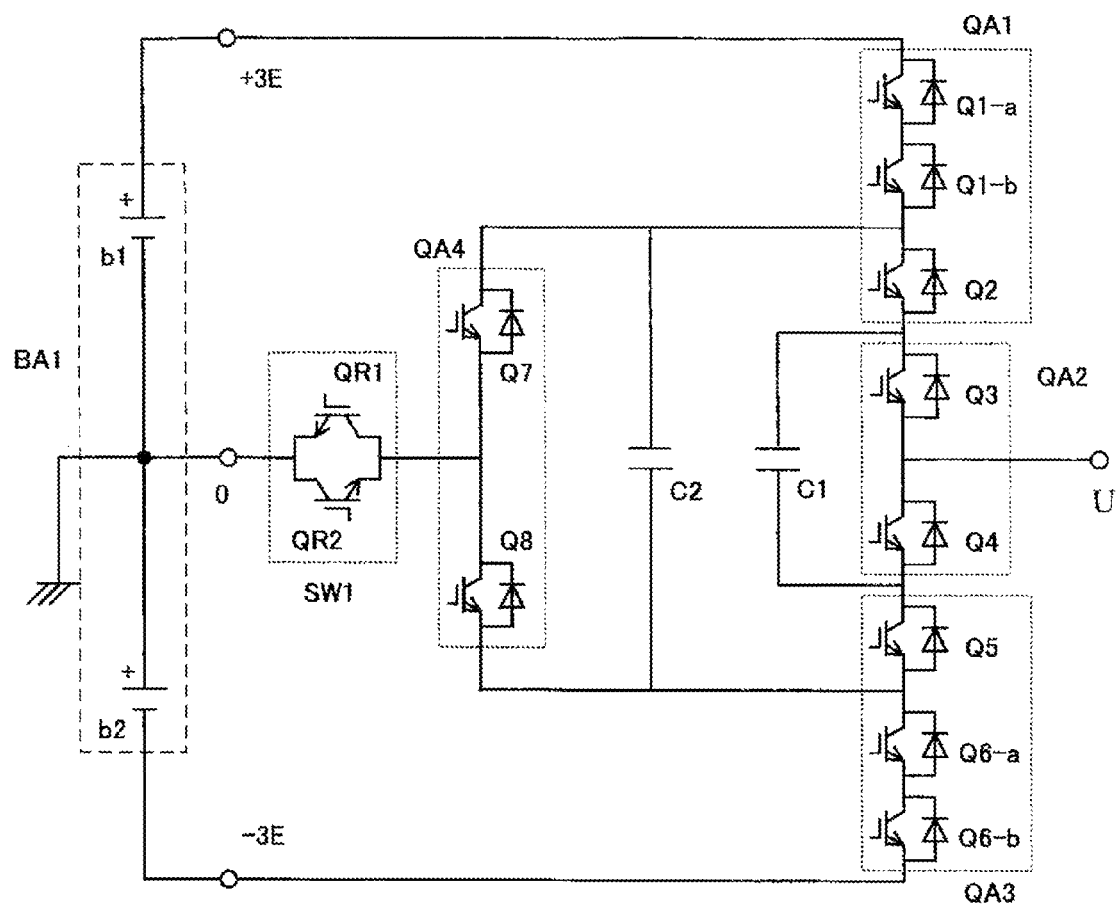
FIG. 19 is a circuit diagram showing an eighth modification example of an embodiment of FIG. 1.

FIG. 19 is an eighth modification example of FIG. 1. The difference from FIG. 1 is that the semiconductor switch Q1 is substituted by a series circuit of Q1$a$ and Q1$b$, and the semiconductor switch Q6 is substituted by a series circuit of Q6$a$ and Q6$b$.

Herein, the substitute semiconductor switches are such that when in switching patterns P1 to P3 and P5 of a seven-level operation, Q1$a$ and Q1$b$ are both turned on, and Q6$a$ and Q6$b$ are both turned off. Also, when in switching patterns P4 and P6 to P8, only one of Q1$a$ or Q1$b$ is turned on, and Q6$a$ and Q6$b$ are both turned off. When in switching patterns P9 to P11 and P13, Q1$a$ and Q1$b$ are both turned off, and only one of Q6$a$ or Q6$b$ is turned on. Further, when in switching patterns P12 and P14 to P16, Q1$a$ and Q1$b$ are both turned off, and Q6$a$ and Q6$b$ are both turned on.

On and off patterns in FIG. 19 are shown in FIG. 20.

Each of the pair of Q1$a$ and Q1$b$ and the pair of Q6$a$ and Q6$b$, by being caused to operate in this way, can be replaced with a semiconductor switch series connection circuit with in the order of half the principled minimum breakdown voltage 4E required of Q1 and Q6 in FIG. 1. In this case, as they are individually switched by their respective low-voltage semiconductor elements when making a transition from one mode to another, it is possible to reduce switching loss, thus enabling loss reduction. For example, when using high-voltage IGBTs with several kV or more as switching elements, when they are IGBTs with a certain breakdown voltage or higher, there is a case in which the switching characteristics or steady loss characteristics deteriorate extremely, but by taking the heretofore described kinds of measures in this kind of case, it is possible to apply low-voltage elements superior in the characteristics, thus possible to contribute to loss reduction.

Figure 21:
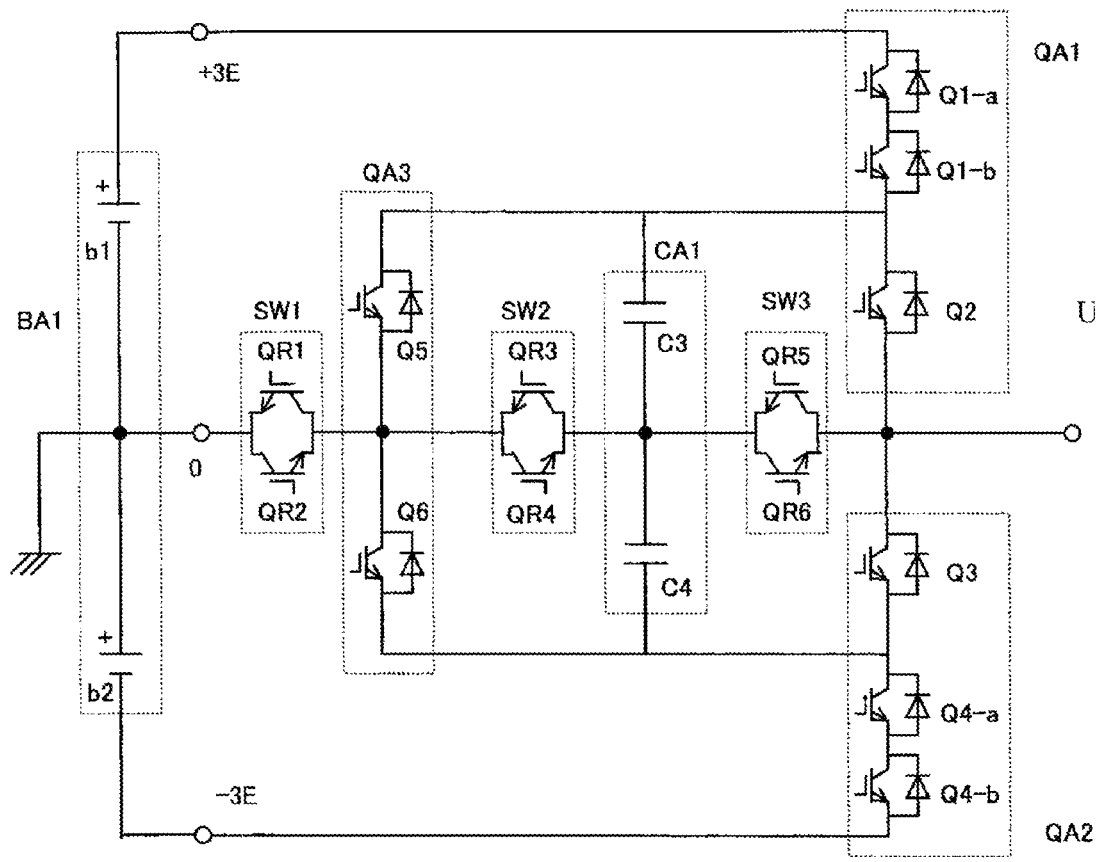
FIG. 21 is a circuit diagram showing a second modification example of an embodiment of FIG. 12.
Figure 23:
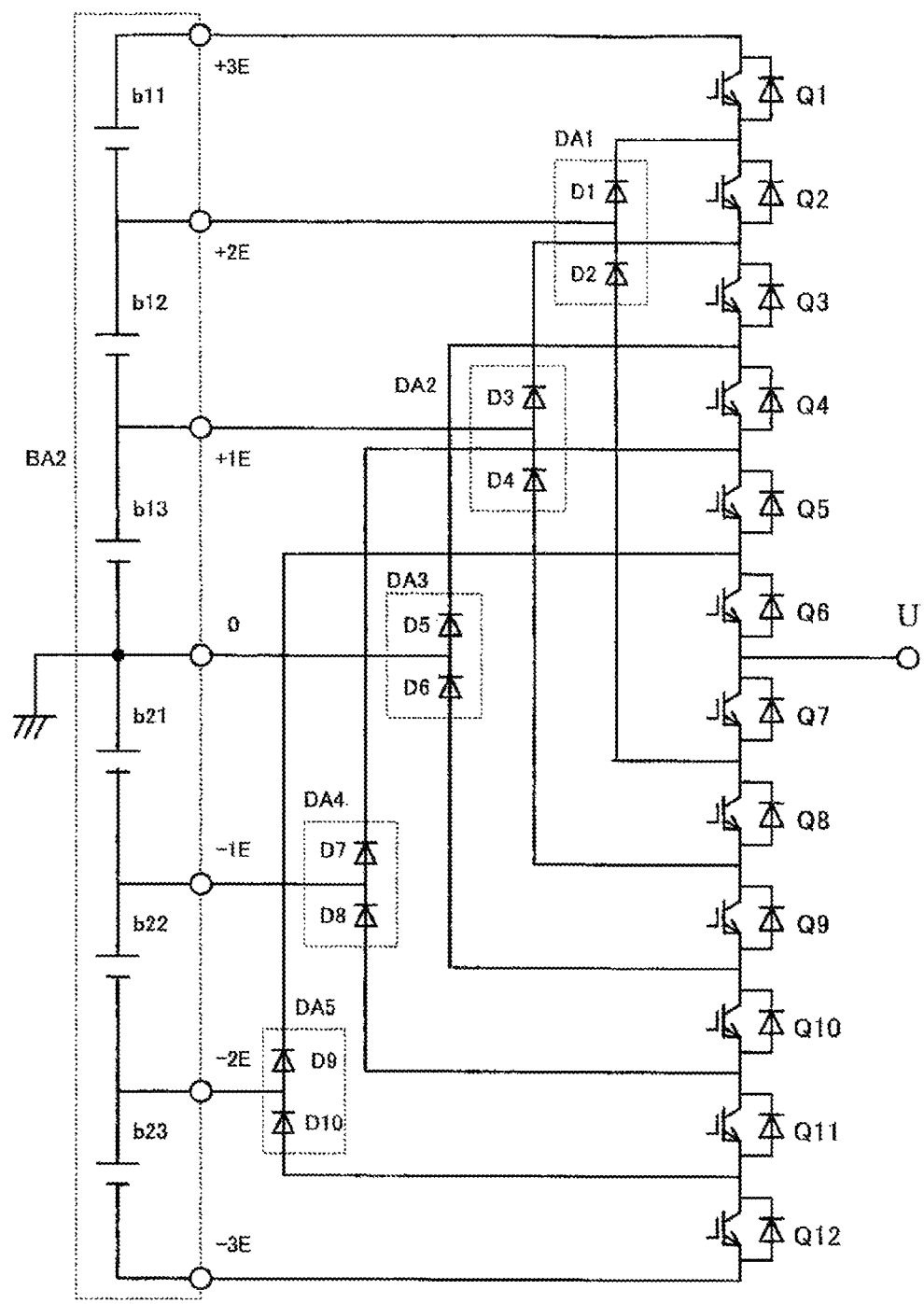
FIG. 23 is a circuit diagram showing a seven-level converter circuit described in PTL 1.
Figure 24:
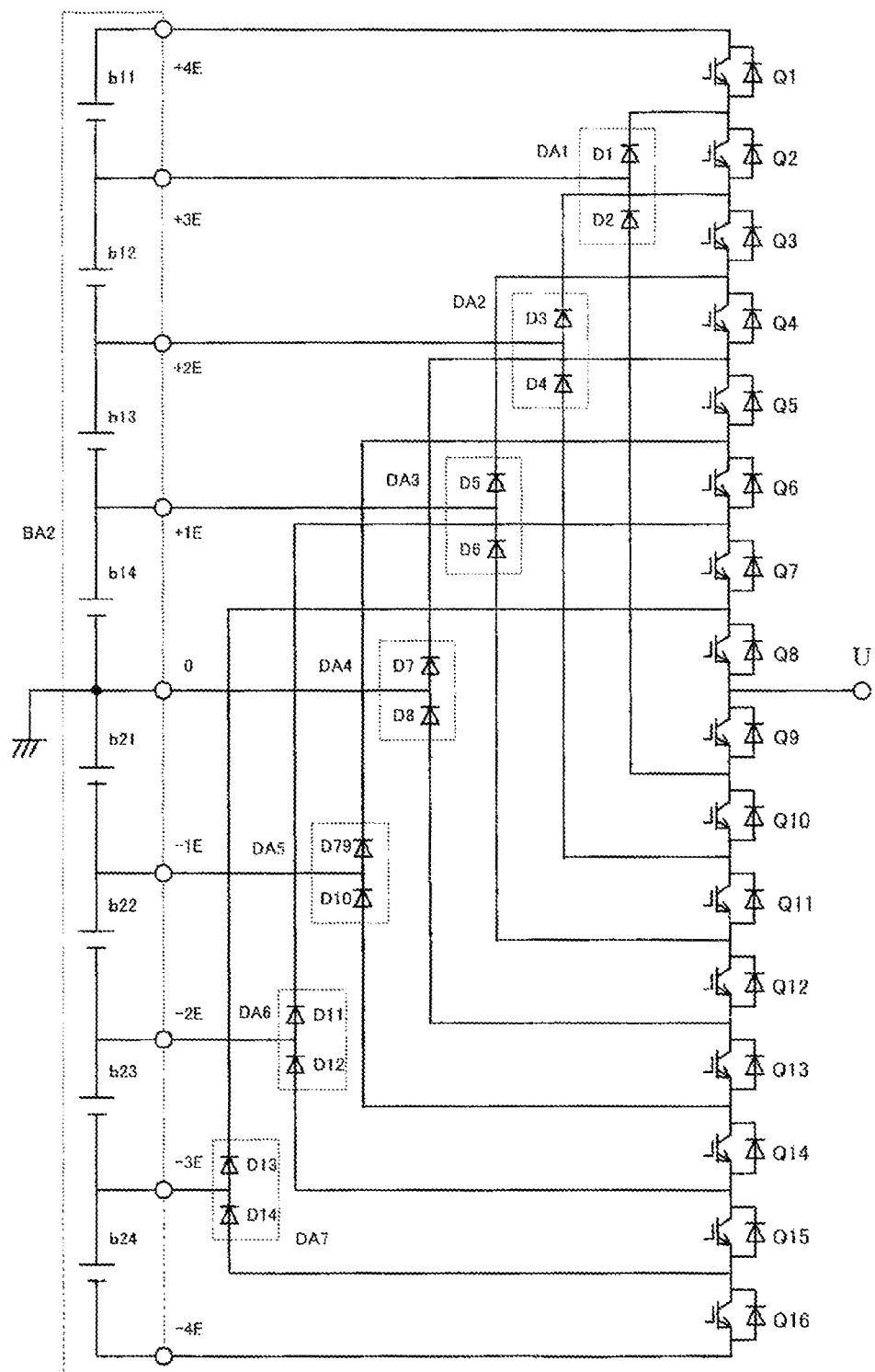
FIG. 24 is a circuit diagram showing a heretofore known example of a nine-level converter circuit.

FIG. 21 shows a second modification example of FIG. 12. The difference from FIG. 12 is that the semiconductor switch Q1 is substituted by a series circuit of Q1$a$ and Q1$b$, and likewise, the semiconductor switch Q4 is substituted by a series circuit of Q4$a$ and Q4$b$, in the same way as in FIG. 19.

Herein, the substitute semiconductor switches are such that when in switching patterns P1', P2', and P4' of a seven-level operation, Q1$a$ and Q1$b$ are both turned on, and Q4$a$ and Q4$b$ are both turned off. Also, when in switching patterns P5' to P9', only one of Q1$a$ or Q1$b$ and only one of Q4$a$ or Q4$b$ are turned on. When in switching patterns P10', P12', and P13', Q1$a$ and Q1$b$ are both turned off, and Q4$a$ and Q4$b$ are both turned on. Further, when in switching patterns P3' and P11', Q1$a$, Q1$b$, Q4$a$, and Q4$b$ are all turned off.

On and off patterns in FIG. 21 are shown in FIG. 22. I to VII in FIG. 22 represent operation modes, wherein I represents a case of causing the semiconductor switches to operate in the switching pattern P1', IIa in the switching pattern P2', IIb in the switching pattern P3', . . . VII in the switching pattern P13'.

Each of the pair of Q1$a$ and Q1$b$ and the pair of Q4$a$ and Q4$b$, by being caused to operate in this way, can be replaced with a semiconductor switch series connection circuit with in the order of half the principled minimum breakdown voltage 4E required of Q1 and Q4 in FIG. 12, and by applying low-voltage elements superior in the characteristics, it is possible to contribute to loss reduction.

What is claimed is:

1. A multilevel converter circuit which generates a plurality of voltage levels from a direct current power source divided into two portions, including three terminals, and having three mutually different voltage levels including zero, and selects from and outputs the plurality of voltage levels, comprising:
   first, second, third, and fourth arm pairs, each configured by connecting two arms formed of semiconductor switches directly in series; and
   a first alternating current switch configured by combining semiconductor switches, the multilevel converter circuit wherein
   respective outer side terminals of the first arm pair, second arm pair, and third arm pair are connected in series, in order from a first direct current terminal, between the first direct current terminal wherein the potential of the direct current power source is highest and a third direct current terminal wherein the potential is lowest,
   the outer side terminals of the fourth arm pair are connected between the midpoint terminal of the first arm pair and the midpoint terminal of the third arm pair,
   both ends of the first alternating current switch are connected between the midpoint terminal of the fourth arm pair and a second direct current terminal wherein the potential of the direct current power source is intermediate,
   both ends of each of a first capacitor and second capacitor are directly connected in parallel to both ends of each of the second arm pair and fourth arm pair respectively, the first capacitor having a value to provide a first voltage, the second capacitor having a value to provide a second voltage, the first and second voltages each being a predetermined proportion to the two portions of the direct current power source, and
   the midpoint terminal of the second arm pair is formed as an alternating current terminal.

2. The multilevel converter circuit according to claim 1, wherein
   both ends of a second alternating current switch are connected between the midpoint terminal of the fourth arm pair and the midpoint terminal of the second arm pair.

3. The multilevel converter circuit according to claim 2, wherein
   a fifth arm pair is connected between the outer side terminals of the second arm pair, and
   both ends of the second alternating current switch are connected between the midpoint terminal of the fifth arm pair and the midpoint terminal of the fourth arm pair.

4. The multilevel converter circuit according to claim 3, wherein
   both ends of a third alternating current switch are connected between the midpoint terminal of the fifth arm pair and the midpoint terminal of the second arm pair.

5. The multilevel converter circuit according to claim 3, wherein
   a high potential side arm configuring the first arm pair, a low potential side arm configuring the third arm pair, the two arms configuring the fourth arm pair, and two arms configuring either the second arm pair or fifth arm pair, are all configured of diodes.

6. The multilevel converter circuit according to claim 2, wherein
each of the alternating current switches is configured by connecting semiconductor switches having reverse breakdown voltage characteristics in anti-parallel.

7. The multilevel converter circuit according to claim 1, wherein
a high potential side arm configuring the first arm pair, a low potential side arm configuring the third arm pair, and two arms configuring the fourth arm pair are all configured of diodes.

8. The multilevel converter circuit according to claim 1, wherein
each of a high potential side arm configuring the first arm pair and a low potential side arm configuring the third arm pair is configured of a series connection circuit of a plurality of semiconductor switches having the same function, and
semiconductor switches configuring each arm are controlled by their respective individual control signals.

9. The multilevel converter circuit according to claim 1, wherein
the voltage levels of the three terminals of the direct current power source are set to +3E, 0, and −3E, and the levels of the voltages of the first capacitor and second capacitor are maintained at 1E and 2E respectively, and that
a total of seven levels of voltages, +3E, +2E, 1 E, 0, −1E, −2E, and −3E, are generated using the respective voltages of the direct current power source, first capacitor, and second capacitor, thus enabling an optional selection from and output of the voltage levels.

10. The multilevel converter circuit according to claim 1, wherein
the voltage levels of the three terminals of the direct current power source are set to +4E, 0, and −4E, and the levels of the voltages of the first capacitor and second capacitor are maintained at 1E and 2E respectively, and that
a total of nine levels of voltages, +4E, +3E, +2E, 1 E, 0, −1E, −2E, −3E, and −4E, are generated using the respective voltages of the direct current power source, first capacitor, and second capacitor, thus enabling an optional selection from and output of the voltage levels.

11. A multilevel converter circuit which generates a plurality of voltage levels from a direct current power source divided into two portions, including three terminals, and having three mutually different voltage levels including zero, and selects from and outputs the plurality of voltage levels, comprising:
first, second, and third arm pairs, each configured by connecting two arms formed of semiconductor switches in series; and
first, second, and third alternating current switches, each configured by combining semiconductor switches, the multilevel converter circuit wherein
respective outer side terminals of the first arm pair and second arm pair are connected in series, in order from a first direct current terminal, between the first direct current terminal wherein the potential of the direct current power source is highest and a third direct current terminal wherein the potential is lowest,
the outer side terminals of the third arm pair are connected between the midpoint terminal of the first arm pair and the midpoint terminal of the second arm pair,
both ends of the first alternating current switch are connected between the midpoint terminal of the third arm pair and a second direct current terminal wherein the potential of the direct current power source is intermediate,
the outer side terminals of a connection circuit, wherein two capacitors are connected in series, are connected in parallel to the outer side terminals of the third arm pair, each of the two capacitors having a value to provide a capacitor voltage, the capacitor voltage being a predetermined proportion to the two portions of the direct current power source,
both ends of the second alternating current switch is connected between the midpoint terminal of the capacitor series connection circuit and the midpoint terminal of the third arm pair,
both ends of the third alternating current switch are connected between the midpoint terminal of the capacitor series connection circuit and the connecting point of the first arm pair and second arm pair, and
the connecting point of the first arm pair, second arm pair, and third alternating current switch is formed as an alternating current terminal.

12. The multilevel converter circuit according to claim 11, wherein
a high potential side arm configuring the first arm pair, a low potential side arm configuring the second arm pair, and two arms configuring the third arm pair, are all configured of diodes.

13. The multilevel converter circuit according to claim 11, wherein
each of a high potential side arm configuring the first arm pair and a low potential side arm configuring the second arm pair is configured of a series connection circuit of a plurality of semiconductor switches having the same function, and
semiconductor switches configuring each arm are controlled by their respective individual control signals.

14. The multilevel converter circuit according to claim 11, wherein
the voltage levels of the three terminals of the direct current power source are set to +3E, 0, and −3E, and
a total of seven levels of voltages, +3E, +2E, 1 E, 0, −1E, −2E, and −3E, are generated using the respective voltages of the direct current power source and two capacitors, thus enabling an optional selection from and output of the voltage levels.

* * * * *